(12) United States Patent
Leistner et al.

(10) Patent No.: US 12,473,904 B2
(45) Date of Patent: Nov. 18, 2025

(54) ELECTROSTATIC MICRO-PUMP AND A PROCESS TO PRODUCE AN ELECTROSTATIC MICRO-PUMP

(71) Applicant: Fraunhofer-Gesellschaft zur Förderung der angewandten Forschung e.V., Munich (DE)

(72) Inventors: Henry Leistner, Munich (DE); Martin Wackerle, Munich (DE); Martin Richter, Munich (DE); Robert Wieland, Munich (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/179,055

(22) Filed: Mar. 6, 2023

(65) Prior Publication Data
US 2023/0265842 A1  Aug. 24, 2023

Related U.S. Application Data

(63) Continuation of application No. PCT/EP2020/075208, filed on Sep. 9, 2020.

(51) Int. Cl.
*F04B 43/04* (2006.01)

(52) U.S. Cl.
CPC .......... *F04B 43/043* (2013.01); *F04B 43/046* (2013.01)

(58) Field of Classification Search
CPC .............................. F04B 43/043; F04B 43/046
See application file for complete search history.

(56) References Cited

U.S. PATENT DOCUMENTS 2,187,264 A  *  1/1940  Carlson ............... F01M 13/021
                                                            55/525
4,179,246 A  *  12/1979  Volker ................ F04B 39/128
                                                            417/313
(Continued)

FOREIGN PATENT DOCUMENTS

CN  102884352 A  1/2013
DE  19719861 A1  11/1998
(Continued)

OTHER PUBLICATIONS

Tomoaki Kishi, "Office Action for JP Application No. 2023-515684", Dec. 26, 2023, JPO, Japan.
(Continued)

*Primary Examiner* — Christopher S Bobish
(74) *Attorney, Agent, or Firm* — Bridgeway IP Law Group, PLLC; Jihun Kim

(57) ABSTRACT

An embodiment is an electrostatic micro-pump including a diaphragm arrangement including a diaphragm and a first electrode structure. The electrostatic micro-pump further includes a valve arrangement, including an inlet check valve and an outlet check valve, wherein the diaphragm arrangement and the valve arrangement at least partially enclose a pump chamber. The electrostatic micro-pump further includes a second electrode structure arranged so as to form an electrostatic drive with the first electrode structure. The electrostatic drive is configured to deflect the diaphragm. The electrostatic micro-pump further includes at least one anti-stiction bump arranged between the first electrode structure and the second electrode structure, wherein in an inactive state of the micro-pump, a spacing between the first electrode structure and the second electrode structure varies towards a center region of the pump chamber when starting (Continued)

from a peripheral region of the pump chamber, wherein the peripheral region encloses the center region.

18 Claims, 26 Drawing Sheets

(56) References Cited

U.S. PATENT DOCUMENTS

| | | | |
|---|---|---|---|
| 5,529,465 A * | 6/1996 | Zengerle | F04B 53/1055 |
| | | | 417/413.2 |
| 5,542,821 A * | 8/1996 | Dugan | F04B 17/00 |
| | | | 417/322 |
| 5,759,015 A | 6/1998 | Van Lintel et al. | |
| 6,106,245 A | 8/2000 | Cabuz | |
| 6,395,638 B1 * | 5/2002 | Linnemann | F16K 99/0007 |
| | | | 438/719 |
| 6,572,218 B2 * | 6/2003 | Gulvin | H02N 1/006 |
| | | | 347/54 |
| 6,767,190 B2 * | 7/2004 | Cabuz | F04B 43/025 |
| | | | 417/322 |
| 6,948,918 B2 * | 9/2005 | Hansen | F16K 99/0015 |
| | | | 604/153 |
| 8,308,452 B2 | 11/2012 | Amirouche et al. | |
| 9,410,641 B2 * | 8/2016 | Herz | F04B 43/043 |
| 10,767,641 B2 * | 9/2020 | Corigliano | F04B 53/1072 |
| 2002/0097303 A1 | 7/2002 | Gulvin et al. | |
| 2006/0181594 A1 * | 8/2006 | Fujii | B41J 2/1631 |
| | | | 347/112 |
| 2007/0188582 A1 * | 8/2007 | Cabuz | F04B 43/043 |
| | | | 347/112 |
| 2008/0048520 A1 * | 2/2008 | Gulvin | H01H 59/0009 |
| | | | 310/309 |
| 2010/0021322 A1 * | 1/2010 | Kitahara | F04B 43/046 |
| | | | 417/413.2 |
| 2013/0055889 A1 | 3/2013 | Herz et al. | |
| 2020/0140264 A1 * | 5/2020 | Mou | B81C 1/00071 |

FOREIGN PATENT DOCUMENTS

| | | |
|---|---|---|
| EP | 2542810 A1 | 1/2013 |
| EP | 3772589 A1 | 2/2021 |
| JP | H09-507279 A | 7/1997 |
| JP | 2002-240285 A | 8/2002 |
| JP | 3718724 B2 | 11/2005 |
| JP | 2005307876 A | 11/2005 |
| JP | 2006-289944 A | 10/2006 |
| JP | 2007-242607 A | 9/2007 |
| JP | 2010-268412 A | 11/2010 |
| JP | 2013-224995 A | 10/2013 |
| WO | 9305295 A1 | 3/1993 |
| WO | 2004109085 A1 | 12/2004 |
| WO | 2010134244 A1 | 11/2010 |
| WO | 2011/107162 A1 | 9/2011 |

OTHER PUBLICATIONS

Dissertation Martin Richter (1998) Universität der Bundeswehr München, Fakultät für Elektrotechnik, Institut für Physik, "Modellierung und experimentelle Charakterisierung von Mikrofluidsystemen und deren Komponenten".

* cited by examiner

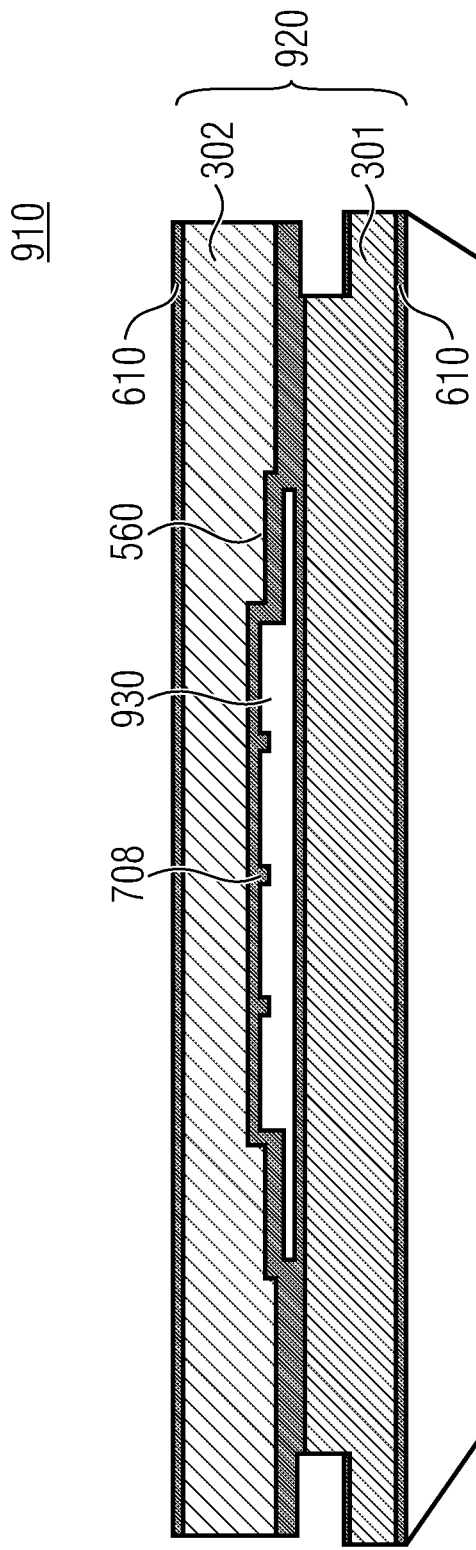
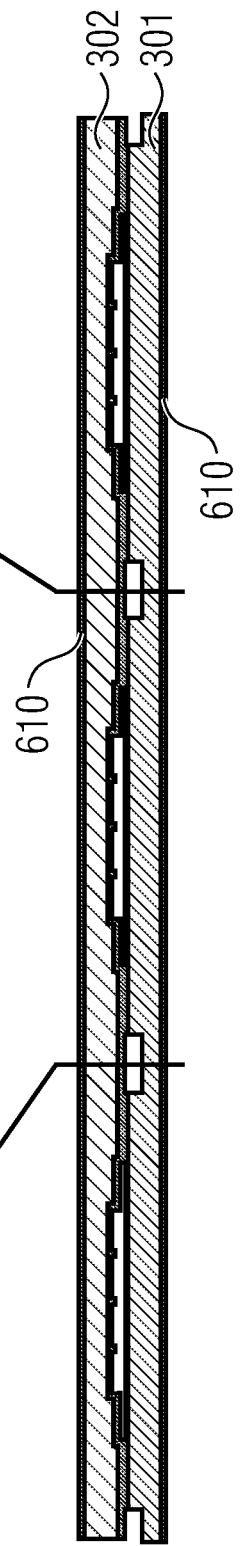
Fig. 9A
Fig. 9B

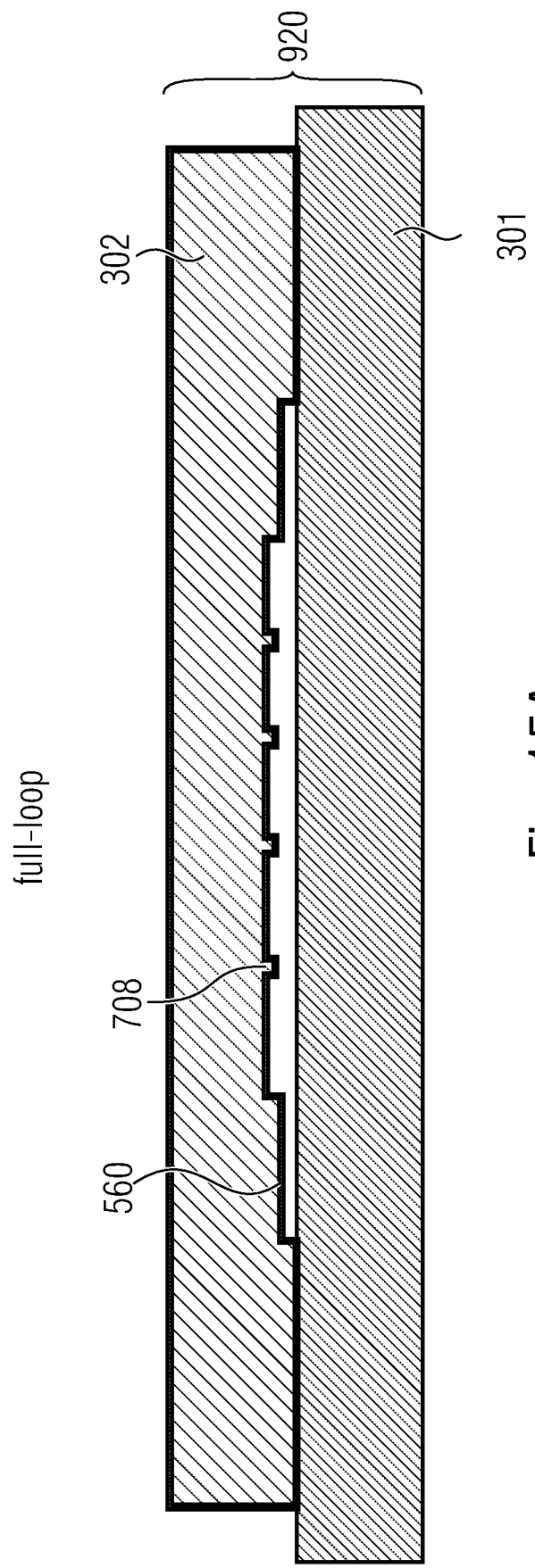

| design electrostatic micropump | symbol | unit | reference | 10x10 | 7x7 |
|---|---|---|---|---|---|
| ΔV [nl] desing | ΔV | nl | 39 | 149 | 72 |
| Δp$_{block}$ [kPa] blocking pressure | Δp$_{block}$ | kPa | 35 | 32 | 28 |
| switch voltage | Us | V | 149 | 144 | 133 |
| pmaxgas [kPa] | pmaxgas | kPa | 12.6 | 13.0 | 11.1 |
| pmingas [kPa] | pmingas | kPa | -21.5 | -34.9 | -28.3 |
| max. actuation voltage breakthrough | ubreak | V | 6.0E+02 | 6.0E+02 | 6.0E+02 |
| actuation gap chamber height | dg | m | 5.0E-06 | 5.0E-06 | 5.0E-06 |
| spacer heigth | ds | m | 5.0E-08 | 5.0E-08 | 5.0E-08 |
| isolation thickness | di | m | 8.0E-07 | 8.0E-07 | 8.0E-07 |
| epsilon r oxid | εr | 1 | 3.9E+00 | 3.9E+00 | 3.9E+00 |
| volume factor lamda | λ | 1 | 4.0E-01 | 4.0E-01 | 4.0E-01 |
| thickness diaphragm | Td | m | 5.0E-05 | 1.2E-04 | 7.0E-05 |
| chip size | cp | m | 7.0E-03 | 1.0E-02 | 7.0E-03 |
| distance to chip border | ds | m | 1.0E-03 | 1.0E-04 | 1.0E-04 |
| radius membran | Rd | m | 2.5E-03 | 4.9E-03 | 3.4E-03 |
| plate stiffness | S | Nm | 1.8E-03 | 2.5E-02 | 4.9E-03 |
| pump chamber height | hpk | m | 1.0E-06 | 1.0E-06 | 1.0E-06 |

Fig. 16 (Part 1)

| 5x5 | 3x3 | 2x2 | 1.5x1.5 | 1x1 | comment |
|---|---|---|---|---|---|
| 36 | 12.2 | 5.0 | 2.6 | 1.0 | stroke volume of the micropump |
| 30 | 34 | 36 | 44 | 53 | blocking pressure of the actuation unit |
| 138 | 148 | 152 | 168 | 184 | snap voltage |
| 11.1 | 10.0 | 12.7 | 12.2 | 8.2 | max air back pressure (relative to atmosphere press.) |
| -20.6 | -10.1 | -19.7 | -11.5 | -4.7 | min. air sucking pressure (relative to atmosphre press.) |
| 6.0E+02 | 6.0E+02 | 6.0E+02 | 6.0E+02 | 6.0E+02 | breakthrough voltage |
| 5.0E-06 | 5.0E-06 | 5.0E-06 | 5.0E-06 | 5.0E-06 | height of the actuation chamber |
| 5.0E-08 | 5.0E-08 | 5.0E-08 | 5.0E-08 | 5.0E-08 | height og the spacer |
| 8.0E-07 | 8.0E-07 | 8.0E-07 | 8.0E-07 | 8.0E-07 | thickness isolation |
| 3.9E+00 | 3.9E+00 | 3.9E+00 | 3.9E+00 | 3.9E+00 | dielectric constant of isolation oxide |
| 4.0E-01 | 4.0E-01 | 4.0E-01 | 4.0E-01 | 4.0E-01 | ratio stroke volume to actuation volume (empiric) |
| 4.5E-05 | 2.3E-05 | 1.3E-05 | 9.0E-06 | 5.0E-06 | thickness of diaphragm |
| 5.0E-03 | 3.0E-03 | 2.0E-03 | 1.5E-03 | 1.0E-03 | size of the silicon chip |
| 1.0E-04 | 1.0E-04 | 1.0E-04 | 1.0E-04 | 1.0E-04 | minimum distance of the pump chamber to chip edge |
| 2.4E-03 | 1.4E-03 | 9.0E-04 | 6.5E-04 | 4.0E-04 | radius of the diaphragm |
| 1.3E-03 | 1.7E-04 | 3.1E-05 | 1.0E-05 | 1.8E-03 | plate stiffness |
| 1.0E-06 | 1.0E-06 | 1.0E-07 | 1.0E-07 | 1.0E-07 | height of the pump chamber |

Fig. 16 (Part 2)

ELECTROSTATIC MICRO-PUMP AND A PROCESS TO PRODUCE AN ELECTROSTATIC MICRO-PUMP

CROSS-REFERENCE TO RELATED APPLICATION

This application is a continuation of copending International Application No. PCT/EP2020/075208, filed Sep. 9, 2020, which is incorporated herein by reference in its entirety.

Embodiments according to the invention are related to micromechanical actuators. Further embodiments according to the invention are related to micromechanical pumps. Further embodiments according to the invention are related to electrostatic micromechanical pumps.

BACKGROUND OF THE INVENTION

Vertical electrostatic actuators show instability during operation because the electrostatic force at or above a characteristic electrical voltage outweighs an electrode spacing and a hydrostatic pressure of the mechanical restoring force. This non-linearity is used in the operation of the actuator, to reduce the operating voltage and to use less energy, if the non-operative distance of the electrodes is adjusted. Furthermore, the operation of an electrostatic actuator requires a passivation or an insulation of the electrodes in the electrical field and/or of the sidewalls, in order to prevent electrical short circuits or even electrical breakdowns.

As electrostatic forces are short-range, electrostatically driven micro-pumps have relatively small strokes. The deflecting forces are quadratically proportional with the distance between the electrodes. For example, a known micro-pump might have a stroke of only 5 µm, resulting in a small stroke volume of only about 40 nl. Having a large dead volume results in a very small compression ratio. A known micro-pump is not bubble-tolerant and is not suited for a compressible medium such as air, making the micro-pump not really practical.

Further, the known micro-pump is manually built, in order to prevent an electrical contact or a short circuit between a counter electrode and the diaphragm when using a necessarily high supply voltage of 200 V or more. Building chips manually is completely uneconomical.

On the other side, electrostatically driven micro-pump made of silicon would have many advantages compared to piezo driven micro-pumps:
  Complete wafer level processing in standard MEMS foundries, no piezo gluing
  All process steps are established silicon micromachining technologies on wafer level
  No manufacturing tolerances due to piezo placement, glue dosing, glue gardening, etc. . . . .
  All mechanical parts are from silicon: no ceramics, no fatigue, no micro cracks during long term operation
  Only silicon as material (no Pb like in PZT piezo, fulfilling RoHS)
  Operation at very high temperatures possible, up to 800° C. estimated (only silicon, depend on material for electrical interface)
  No piezo, for that no hysteresis occurring
  Capacitance 100 pF instead of 2 nF (piezo): energy consumption is smaller
  Miniaturisation potential:
    Piezo is limited to pick&place of ceramics, not small than 3×3 mm2 feasible
    Electrostatic driven pump can be realized even smaller (2×2, maybe 1×1 mm2), no pick&place necessary
    Stroke of electrostatic actuation (around 5 µm at 200V) is mainly independent from chip size. For piezo the stroke depend also on chip size
  2×2 mm2 micro-pump:
    8000 micro-pumps/wafer at 8 inch
    manufacturing costs at >200 wspw is around 10 cents Although there are so many benefits of electrostatically driven micro-pumps compared to piezo driven pumps, no electrostatically driven micro-pumps are available on the market.

There is a need for realizing an electrostatic micro-pump configured to be produced at the wafer-level, while minimizing the risk of short-circuits. This invention overcome the drawback of known electrostatically driven micro-pumps, enabling the benefits mentioned above.

SUMMARY

An embodiment may have an electrostatic micro-pump comprising a diaphragm arrangement comprising a diaphragm and a first electrode structure, a valve arrangement, comprising an inlet check valve and an outlet check valve, wherein the diaphragm arrangement and the valve arrangement at least partially enclose a pump chamber, a second electrode structure arranged so as to form an electrostatic drive with the first electrode structure, the electrostatic drive configured to deflect the diaphragm; at least one anti-stiction bump arranged between the first electrode structure and the second electrode structure; and wherein, in an inactive state of the micro-pump, a spacing between the first electrode structure and the second electrode structure varies towards a center region of the pump chamber when starting from a peripheral region of the pump chamber, the peripheral region enclosing the center region.

Another embodiment may have a process to produce an electrostatic micro-pump, comprising: arranging a diaphragm arrangement, so as to comprise a diaphragm and a first electrode structure, and arranging a valve arrangement, so as to comprise an inlet check valve and an outlet check valve, such that the diaphragm arrangement and the valve arrangement enclose at least partially a pump chamber, arranging a second electrode structure, so as to form an electrostatic drive with the first electrode structure to deflect the diaphragm; arranging at least one anti-stiction bump between the first electrode structure and the second electrode structure; such that, in an inactive state of the micro-pump, a spacing between the first electrode structure and the second electrode structure varies towards a center region of the pump chamber when starting from a peripheral region of the pump chamber, the peripheral region enclosing the center region arranging a stator structure; such that, the diaphragm arrangement is arranged between the valve arrangement and the stator structure, such that the stator structure and the diaphragm arrangement encloses an electrode chamber, and such that the stator structure comprises a conductive layer being at least a part of the second electrode structure; and arranging a vent opening, which connects the electrode chamber with an environment of the electrostatic micro-pump, such that, the vent opening prevents a contamination of the electrode chamber.

Generally, and to overcome the drawback of known electrostatically driven micro-pumps, an electrostatically actuated diaphragm should have a rather high stroke volume and a sufficient high blocking pressure. Next, the process shall enable the adaption of a valve unit with sufficient small pump chamber dead volume to the actuation unit to achieve a high compression ratio. Moreover, the pump should be able to be assembled on a full wafer level with electrical separated or isolated electrodes. Next, after dicing of the wafer to pump chips, there should be access to the electrodes, and no danger of short circuits at the edges should occur.

An embodiment according to the invention is an electrostatic micro-pump comprising a diaphragm arrangement comprising a diaphragm and a first electrode structure. The electrostatic micro-pump further comprises a valve arrangement, comprising an inlet check valve and an outlet check valve, wherein the diaphragm arrangement and the valve arrangement at least partially enclose a pump chamber. The electrostatic micro-pump further comprises a second electrode structure arranged so as to form an electrostatic drive with the first electrode structure. The electrostatic drive is configured to deflect the diaphragm. The electrostatic micro-pump further comprises at least one anti-stiction bump arranged between the first electrode structure and the second electrode structure, wherein in an inactive state of the micro-pump, a spacing between the first electrode structure and the second electrode structure varies towards a center region of the pump chamber when starting from a peripheral region of the pump chamber, wherein the peripheral region encloses the center region.

In an active state of the micro-pump the diaphragm is configured to be deflected by an electrostatic drive formed by the first electrode structure and the second electrode structure.

The at least one anti-stiction bump is arranged between the first electrode structure and the second electrode structure, in order to prevent the diaphragm from sticking to the second electrode structure.

In an embodiment, the first electrode structure and/or the second electrode structure comprises a varying height-profile, increasing the spacing between the first electrode structure and the second electrode structure from the peripheral region towards the center region of the pump chamber.

The varying height-profile of at least one of the two electrode structures is configured to enlarge the pump chamber and/or a stroke volume of the pump chamber. Further, the varying height-profile may reduce a nearest distance between the first electrode structure and the second electrode structure, which may result in a reduction of a needed voltage and/or energy usage of the electrostatic drive.

The varying height-profile of the counter-electrode has theoretically a limiting effect on the stroke volume, as it forms a mechanical stopper. Therefore it is important to select a height-profile which reduces the operating voltage and does not reduce the stroke volume, but rather increases it.

The volume between the electrodes, between the moving and the rigid electrode, in an actuated state can have about half the value of the volume between the electrodes in an unactuated state.

According to an embodiment the at least one anti-stiction bump is arranged at the first or second electrode structure opposing the varying height-profile.

The at least one anti-stiction bump may be arranged at the second electrode structure, that is not at the first electrode structure or not at the diaphragm arrangement. The at least one anti-stiction bump may be arranged at the second electrode structure opposing the varying height-profile. The anti-stiction bumps reduce the risk of occurrence of a sticking between the first electrode structure and the second electrode structure, for example, in case the supply voltage exceeds a pull-in voltage, and/or for example, in case the diaphragm is pressed against the counter electrode by the hydrostatic pressure. The at least one anti-stiction bump reduces the occurrence of both an electrostatic sticking, in case the pull-in voltage is exceeded, and also the Van der Waals sticking, caused by the hydrostatic pressure.

Arranging the anti-stiction bump so as to oppose the varying height profile, e. g., at a planar surface may allow for an easy arrangement or generation of the anti-stiction bump and a precision of the varying height profile to be unaffected by the generation of the anti-stiction bump.

One problem using electrostatic actuation is the electrostatic sticking. If a high voltage is applied, the two parts gets in touch with each other. In that situation, very high electrical fields occur in the insulation layer, and electric charges can (driven by this high field) mitigate above the border of the two parts into the insulation layer. After that, if the voltage is released, the charges stay in the insulation layer, making electrostatic sticking. To overcome that situation, one promising strategy is to reduce the contact area, where the high electrical field is applied, e.g. by anti-stiction bumps. The function of the anti-stiction bumps is to reduce the hard-hard contact area, to reduce the area where charges can mitigate. The electrostatic sticking will be reduced by the ratio between the contact area with bumps with the contact area without pumps. Additionally the beneficial ratio will also reduce the van-der-Waals sticking as well. Moreover a bipolar (eg. from −200 V to 200V) driving voltage of the actuator or micro-pump will also reduce the effect of electrostatic sticking.

Regarding the design of the bumps, there are the following boundary conditions: as the height of the bumps is reducing the stroke of the actuator, this height should be as small as possible. Regarding on the etching technology, a height between 10 nanometer and 200 nanometer is feasible. A small air gap is already sufficient to avoid charge mitigation in these regions.

The contact area of all bumps should be much smaller compared to the contact area without pumps (to reduce sticking). However, if this contact area of the sum of all bumps is too small, the whole force is concentrating at this small area, which can exceed the mechanical stability of the bumps. The bumps can be damaged by the electrostatic compressive force at the bumps. For that, this contact area should be chosen, that it will be significantly below max. mechanical stress, which can be applied. For single crystal silicon this value is about 4 GPa, for silicon oxide it is smaller.

According to embodiments, the spacing between the first electrode structure and the second electrode structure increases stepwise in a plurality of steps, starting from the peripheral region towards the center region of the pump chamber.

A height-profile, stepwise increasing from the peripheral region towards the center region, of the pump and/or electrode chamber may reduce the nearest distance between the first electrode structure and the second electrode structure, resulting in a reduced need of a supply voltage, reducing the energy usage of the micro-pump and allowing a usage of smaller and established circuits for high-voltage generation.

In an embodiment, in the peripheral region, the first electrode structure and the second electrode structure are insulated from each other by an insulating layer providing for a mechanical contact to the first electrode structure and the second electrode structure and preventing an occurrence of an electric break-through between the first electrode structure and the second electrode structure.

As the first electrode structure and the second electrode structure are forming the electrostatic drive to deflect the diaphragm, an occurrence of the electric break-through between the first and the second electrode structure may result in a small electrostatic force to deflect the diaphragm. That is, the electric break-through between the two electrode structures are not preferred and is prevented by the insulating layer between the two electrode structures.

In an embodiment the electrostatic drive is configured to change a pressure in the pump chamber and/or a volume of the pump chamber based on the voltage between the first electrode structure and the second electrode structure.

The electrostatic drive formed by the first and the second electrode structure is applying the pressure on the pump chamber wherein the force is dependent on the voltage between the first electrode structure and the second electrode structure. The voltage between the first and second electrode structure can be changed in small steps, which makes the micro-pump a practical device, wherein the volume and/or the pressure of the pump chamber can be set deliberately, in small steps.

In an embodiment, the valve arrangement is a layer arrangement. The inlet check valve and the outlet check valve are arranged in-plane with respect to the valve arrangement. Both the inlet check valve and the outlet check valve comprise an inlet-tunnel, a valve flap, an outlet-tunnel and a dead volume, configured to guide a fluid flow through the inlet-tunnel, through the valve flap in an open state, and through the outlet-tunnel. A direction of the fluid flow through the inlet check valve is opposite to a direction of the fluid flow through the outlet check valve.

The electrostatic micro-pump comprises at least one inlet check valve and at least one outlet check valve. In order to reach a fast and/or cheap production, the inlet check valves and the outlet check valves might be arranged in the layer arrangement, wherein the inlet and outlet check valves are arranged in-plane with the layer. To further reduce the complexity of the valve arrangement, the same or similar check valves can be used for the inlet check valve and for the outlet check valve, wherein the inlet tunnels of the inlet check valves are pointing to an opposite direction of the inlet tunnels of the outlet check valves.

In an embodiment the diaphragm arrangement comprises a conductive layer being at least part of the first electrode structure.

If the diaphragm of the diaphragm arrangement is made of a non-conductive material, the diaphragm arrangement comprises an additional conductive layer to be part of the first electrode structure.

In an embodiment the valve arrangement comprises a stack of semiconductor-layers and comprises a thickness, perpendicular to a main surface of the valve arrangement, of e. g. 480 µm-540 µm, and/or wherein the diaphragm arrangement comprises a semiconductor-layer with a thickness, perpendicular to a main surface of the diaphragm arrangement, of e. g. 10 µm-120 µm.

In an embodiment the valve arrangement comprises a conductive layer being at least a part of the second electrode structure. An embodiment of the current invention can be realized by attaching the diaphragm arrangement to the valve arrangement. Both the diaphragm arrangement and the valve arrangement comprise a conductive layer or are made of a conductive material, being at least a part of the first or of the second electrode structure. The pump chamber is formed by the valve arrangement and the diaphragm arrangement.

In an embodiment, when being actuated, the electrostatic drive is configured to deflect the diaphragm towards the valve arrangement, to compress the pump chamber, resulting in a fluid flow from the pump chamber through the outlet check valve to an environment.

According to an embodiment the fluid flowing from the pump chamber through the outlet check valve is a non-conductive fluid.

The non-conductive fluid is preventing an occurrence of an electric break-through between the first electrode structure and the second electrode structure, which are forming the pump chamber. The electrical break-through would reduce the force compressing the pump chamber, which is not preferred.

In an embodiment the valve arrangement comprises a stack of semiconductor layers, such as silicon-layers, and comprises a thickness perpendicular to a main surface of the valve arrangement, of e. g. 480 µm to 540 µm, and/or wherein the diaphragm arrangement comprises a semiconductor layer, like a silicon-layer, with a thickness, perpendicular to a main surface of the valve arrangement, of, for example, 10 µm to 120 µm.

According to an embodiment, the electrostatic-pump comprises a stator structure. The diaphragm arrangement is arranged between the valve structure and the stator structure, such that the stator structure and the diaphragm arrangement enclose an electrode chamber. The stator structure comprises a conductive layer being at least a part of the second electrode structure.

The electrostatic micro-pump may comprise the stator structure, the diaphragm arrangement and the valve arrangement. The stator structure is attached to the diaphragm arrangement, forming the electrode chamber. The diaphragm arrangement is further attached to the valve structure forming a pump chamber, wherein the diaphragm arrangement is between the stator structure and the valve arrangement. In this embodiment, the diaphragm arrangement comprises the first electrode structure and the stator structure comprises the second electrode structure.

According to an embodiment, when being actuated, the electrostatic drive is configured to deflect the diaphragm arrangement towards the stator structure to expand the pump chamber, resulting in a fluid flow into the pump chamber through the inlet check valve.

The static drive is formed by the first and the second electrode structure, that is by the stator structure and by the diaphragm arrangement. When being actuated, the stator structure remains mechanically stable and the diaphragm arrangement is deflected towards the stator structure, resulting in a compression of the electrode chamber and an expansion of the pump chamber. As the pump chamber expands, the pressure in the pump chamber drops resulting in a fluid inflow from the environment through the inlet check valve into the pump chamber.

According to an embodiment the fluid flowing into the pump chamber through the inlet check valve is a conductive or a non-conductive fluid.

In the case of the inventive micro-pump comprises a separate electrode chamber and a separate pump chamber, the first and second electrode structure are forming the electrode chamber. In this case, the fluid flowing in the pump chamber has no contact to both of the electrode structures, resulting in that the conductivity of the fluid has no effect on the pump performance of the electrostatic micro-pump.

According to an embodiment, the stator-structure comprises a semiconductor layer, such as a silicon-layer, and comprises a thickness, perpendicular to a main surface of the valve arrangement of e. g. 450 μm.

In an embodiment the stator structure comprises a high stiffness when compared to the diaphragm arrangement.

An electrostatic micro-pump with a stiff stator structure, or at least stiffer than the diaphragm arrangement, has the benefit that when actuated the stator structure remains stable or mechanically stable while the diaphragm arrangement is the moving part.

According to an embodiment the electrostatic micro-pump comprises a vent opening, configured to fluidically connect the electrode chamber with the environment of the electrostatic micro-pump.

The vent opening, connecting the electrode chamber with the environment, acts as a pressure equalizer between the electrode chamber and the environment. In this case, the atmospheric pressure does not change the zero position, that is the position in an unactuated state, of the diaphragm. That is, a high compression ratio can be achieved by a flat diaphragm, and no back pressure is generated in the electrode chamber as the diaphragm moves.

In an embodiment the vent opening is configured to prevent contamination of the electrode chamber by using a meander, a high flow resistance, or a capillary stop.

A contamination of the electrode chamber may reduce a mobility of the diaphragm, may reduce the volume of the electrode chamber and/or may cause electric break-throughs between the first electrode structure and the second electrode structure increasing the voltage and/or electrostatic force needed between the two electrode structures to deflect the diaphragm. Different methods, such a meander, a high flow resistance, and/or a capillary stop prevents a contamination of the electrode chamber.

According to an embodiment the vent opening comprises a filter and/or a buffer volume configured to prevent a contamination of the electrode chamber.

Using a buffer volume to be contaminated instead of the electrode chamber and/or a filter to filter out the contamination may further prevent the contamination of the electrode chamber.

According to an embodiment, the diaphragm of the diaphragm arrangement is pre-deflected.

Instead of using a vent opening, the diaphragm arrangement might be pre-deflected. The pre-deflected diaphragm arrangement might further reduce the distance between the first and second electrode structure, reducing the force and/or voltage needed to compress the electrode chamber and to expand the pump chamber. The diaphragm arrangement might be bonded to the stator structure in vacuum. The extent of the pre-deflection may be dependent on the applied vacuum.

In an embodiment, the diaphragm arrangement is pre-deflected to form a mechanical contact with the stator structure in an unactuated state of the electrostatic drive in a contact area, wherein the electrostatic drive is adapted to increase the contact area in an actuated state.

As the electrostatic force is quadratically dependent on the distance between the first electrode structure and the second electrode structure. The pre-deflected diaphragm arrangement reduces the distance between the electrode structures and may need much less supply voltage to deflect the diaphragm arrangement. A further benefit of the pre-deflected diaphragm arrangement contacting the stator structure is that the height of the electrode chamber might be increased, that is the volume of the pump chamber is increased when the micro-pump is actuated.

In an embodiment, the conductive layer of the first electrode structure and the conductive layer of the second electrode structure are made of a conductive material, such as a metal material, or a highly doped semiconductor material, such as boron or phosphor and silicon, with a conductivity of a metal material.

Further embodiments according to the present invention creates respective methods.

However, it should be noted that the methods are based on the same consideration as the corresponding apparatuses. Moreover, the methods may be supplemented by any of the features or functionalities and described herein with respect to the apparatuses, both individually and taken in combination.

BRIEF DESCRIPTION OF THE DRAWINGS

Embodiments of the present invention will be detailed subsequently referring to the appended drawings, in which:

FIG. 9A shows a schematic side view of an actuator arrangement at a chip level that may be obtained when attaching the insulated first layer to the insulated second layer, according to an embodiment to manufacture a micro-pump;

FIG. 9B shows a schematic side view of multiple actuator arrangements at a wafer level that may be obtained when attaching a wafer of insulated first layer to a wafer of insulated second layer, according to an embodiment to manufacture a micro-pump;

FIG. 15A shows a schematic side view of the actuator arrangement, according to an embodiment;

FIG. 16 show a table of simulated values of electrostatic micro-pump designs, according to embodiments

DETAILED DESCRIPTION OF THE INVENTION

In the following, different inventive embodiments and aspects will be described. Also, further embodiments will be defined by the enclosed claims.

It should be noted that any embodiments as defined by the claims can be supplemented by any of the details, features and functionalities described herein. Also, the embodiments described herein can be used individually and can also optionally be supplemented by any of the details, features and functionalities included in the claims.

Also, it should be noted that individual aspects described herein can be used individually or in combination. Thus, details can be added to each of said individual aspects without adding details to another one of said aspects. It should also be noted that the present disclosure describes explicitly or implicitly features usable in an electrostatic micro-pump. Thus, any of the features described herein can be used in the context of an electrostatic micro-pump. Moreover, features and functionalities disclosed herein relating to a method can also be used in an apparatus configured to perform such functionalities.

Furthermore, any features and functionalities disclosed herein with respect to an apparatus can also be used in a corresponding method. In other words, the method disclosed herein can be supplemented by any of the features and functionalities described with respect to the apparatuses.

The invention will be understood more fully from the detailed description given below and from the accompanying drawings of embodiments of the invention which, however, should not be taken to limit the invention to the specific embodiments described, but are for explanation and understanding only.

Figure 1:
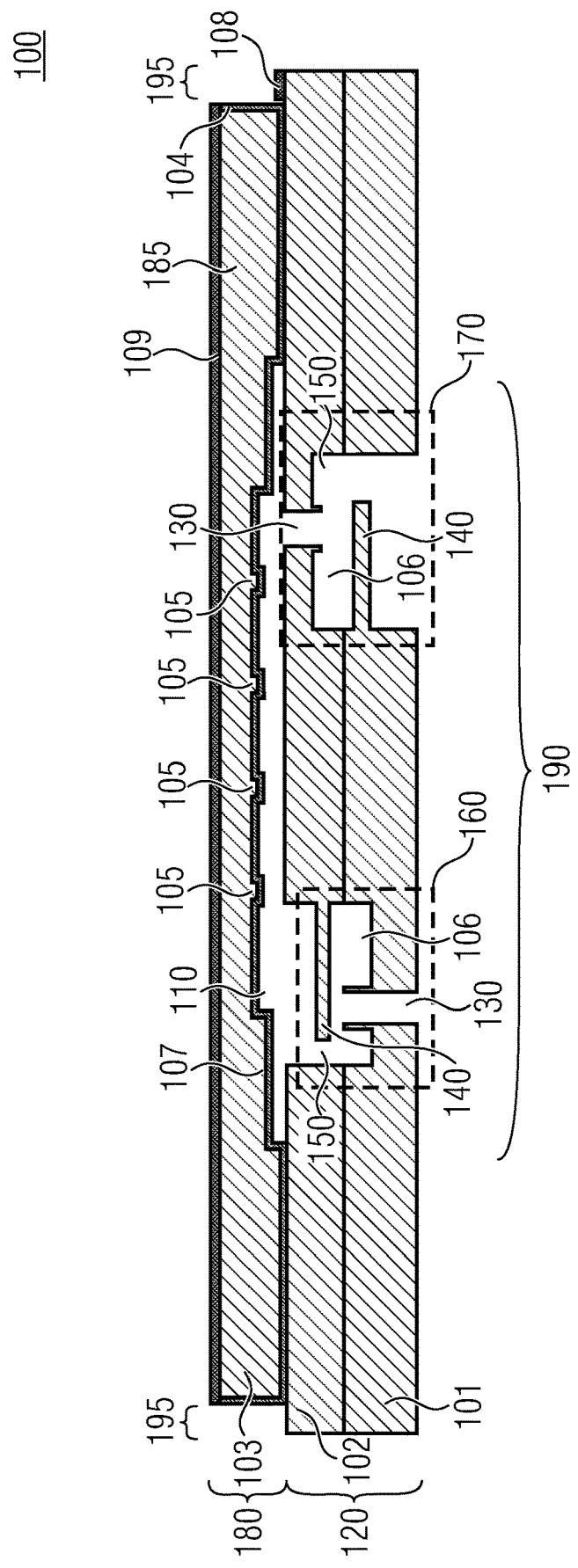
FIG. 1 shows a schematic side view of an electrostatic micro-pump comprising three layers, according to an embodiment.

FIG. 1 shows a schematic side view of an electrostatic micro-pump 100 according to an embodiment, comprising three layers, 101, 102, 103. Although describing layers 101, 102 and 103 as a layer, one or more of them may be formed by a plurality of stacked layers of a same or of different materials. Layer 101, layer 102 and layer 103 may comprise a semiconductor material, e. g. a silicon material. Layer 101, layer 102 and layer 103 may comprise any suitable thickness, advantageous values may be a layer thickness of about, i.e., within a tolerance range of ±50%, ±30 or ±20%, e. g. 450 µm for layer 101, of 30-90 µm for layer 102 and of 10-120 µm for layer 103, respectively.

A main surface of layer 101 is attached to a main surface of layer 102, in order to form a valve arrangement 120 comprising an inlet check valve 160 and an outlet check valve 170. The inlet check valve 160 and the outlet check valve 170 are arranged in-plane with respect to the valve arrangement 120. The inlet check valve 160 and the outlet check valve 170 may have similar structures and, when in an opened state, allowing a fluid to flow in opposing directions.

The layers 101 and 102 may comprise specific structures that form the valves 160 and 170 when being attached to each other. For example, the structure formed by layers 101 and 102 may comprise one or more of an opening, a channel to guide the fluid, such as an inlet tunnel 130 and/or an outlet tunnel 150 or the like. For example, some of the parts may be deflectable, e. g., responsive to fluidic flow and/or to fluidic pressure, such as a valve flap 140. For example, some parts may be formed by way of an empty space allowing the deflection of the deflectable parts, such as a dead volume 106.

A main surface of the valve arrangement 120 is attached to a first main surface 185 of the diaphragm arrangement 180.

The diaphragm arrangement 180 comprises the layer 103 which may be insulated from the valve arrangement 120 by an insulating layer 104, for example a silicon-dioxide layer or a silicon-nitride layer, on the first main surface 185 of the diaphragm arrangement 180. A recess 195 may be remains of an insulation gap being used, for example, to facilitate dicing, being described in connection with FIG. 14.

Both the valve arrangement 120 and the diaphragm arrangement 180 may comprise an electrode structure. The diaphragm arrangement 180 comprises a first electrode structure 109 and the valve arrangement 120 comprises a second electrode structure 108, wherein the first electrode structure is insulated from the second electrode structure by the insulating layer 104. The first electrode structure 109 and the second electrode structure 108 are forming an electrostatic drive configured to deflect the diaphragm arrangement 180. The electrode structures may be a separate layer as indicated in FIG. 1 but may also be implemented, for example, by providing a material of at least one layer so as to comprise a conductive material, e. g., a metal material or a doped semiconductor material, including combinations thereof.

At a center region 190 of the micro-pump 100, comprising the inlet valve 160 and the outlet valve 170, the first main surface 185 of the layer 103 or of the diaphragm arrangement 180 comprises a stepwise varying height-profile 107 and one or more anti-stiction bumps 105. The distance between the diaphragm arrangement 180 and the layers of the valve arrangement 120 obtained, at least in parts by the varying height-profile 107 on the first main surface 185 of the diaphragm arrangement 180 may provide for a volume that may be referred to as a pump chamber 110. Alternatively or additionally, the anti-stiction bumps 105 may be positioned also on an opposing side of the pump chamber 110, that is at the valve-arrangement 120.

The electrostatic micro-pump 100 is configured to be actuated by applying a voltage between the first electrode structure 109 and the second electrode structure 108. The voltage between the electrode structures creates a force compressing the pump chamber 110. The force is quadratically dependent on a distance between the first electrode structure 109 and the second electrode structure 108.

The stepwise varying height-profile 107 may reduce the voltage and/or an energy usage needed to compress the pump chamber 110, compared to the voltage and/or the energy usage needed to compress a pump chamber with a constant distance height-profile, in particular when implementing a membrane structure without predeflection. If the voltage between the electrode structures 108, 109 is high, higher than a pull-in voltage, the first electrode structure 109 is pulled to the second electrode structure 108 such that the diaphragm arrangement 180 may touch the valve arrangement 120. In order to prevent a sticking of the diaphragm arrangement 180 to the valve arrangement 120, the at least one anti-stiction bump 105 is arranged between the first electrode structure 109 and the second electrode structure 108. For example, the anti-stiction bumps 105 of FIG. 1 are arranged on the diaphragm arrangement 180 in the region 190 comprising the inlet check valve and the outlet check valve. However, one or more anti-stiction bumps 105 may, as an alternative or in addition, be arranged so as to oppose the varying height profile, e. g., at layer 102, the valve arrangement 120, respectively.

By actuating the electrostatic drive of the micro-pump 100, the diaphragm arrangement 180 is pulled towards the valve arrangement 120 while compressing the pump chamber 110. The compression of the pump chamber 110 raises the pressure in the pump chamber 110 resulting in an opening of the valve flap 140 of the outlet check valve 170 allowing a fluid outflow from the pump chamber 110 through the outlet check valve 170 into the environment.

Reducing the voltage between the first electrode structure 109 and the second electrode structure 108 may result in that the diaphragm arrangement 180 moves towards or back into its initial or zero position while expanding the pump chamber 110. The expansion of the pump chamber 110 will open up the valve flap 140 of the inlet check valve 160 and allows the fluid to flow from the environment through the inlet check valve 160 into the pump chamber 110. At the same time, the check valve 170 may block the fluid flow through outlet tunnel 130 by blocking it with the valve flap 140.

The electrostatic micro-pump 100 of FIG. 1 has several advantages when compared to a prior-art micro-pump. The stepwise varying height-profile 107 of the pump chamber 110 may operate with a low supply voltage, when compared to a supply voltage of a prior-art micro-pump. The low supply voltage is viewed low in comparison with the supply voltage of the prior-art micro-pump, while still remaining in a high-voltage range. The low supply voltage reduces the energy usage of the electrostatic micro-pump 100 and allows a usage of a small and established high-voltage circuitry.

As a further advantage, operating the electrostatic micro-pump 100 may, in a certain extent, overcome a back pressure. The back pressure hinders the diaphragm arrangement 180 in its motion. An increase of the supply voltage results in an increased electrostatic pressure overcoming the back pressure.

Figure 2:
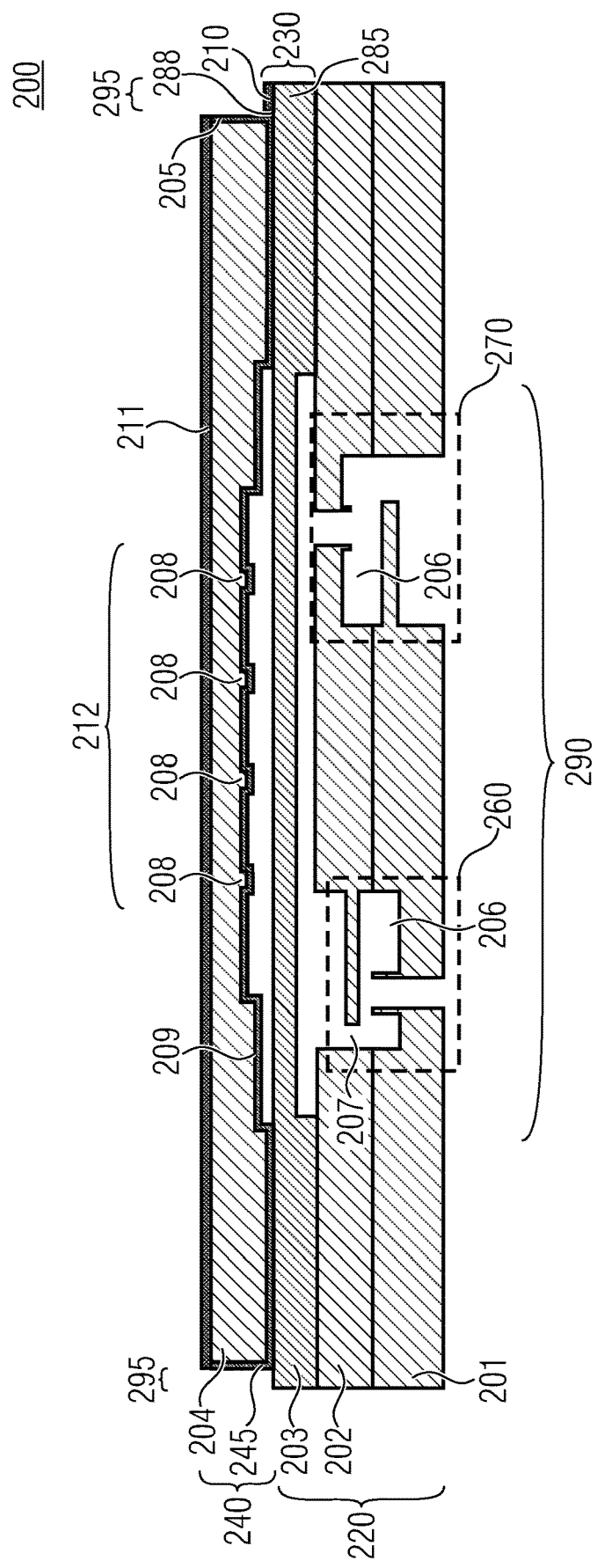
FIG. 2 shows a schematic side view of an electrostatic micro-pump comprising four layers, according to an embodiment.

The electrostatic micro-pump 100 for non-conductive fluids, such as air, may have a high compression ratio, higher than a compression ratio of an electrostatic micro-pump for conductive fluids, such as a micro-pump 200 of FIG. 2, because the deflection of the diaphragm arrangement 120 points towards the pump chamber 110, which may reduce additional dead volumes 106.

FIG. 2 shows a schematic side view of an electrostatic micro-pump 200, an embodiment, comprising four layers 201-204. Although describing layers 201-204 as a layer, one or more of them may be formed by a plurality of stacked layers of a same or of different materials. Layers 201-204 may comprise a semiconductor material, e. g. silicon material. Layers 201-204 may comprise a thickness of, e. g. 450 µm, 30-90 µm, 10-120 µm and 450 µm respectively, possibly within a tolerance range of e.g., ±50%, ±30 or ±20%.

A region 295 may be remains of a trench structure used or generated to facilitate dicing as described, for example, ion connection with FIG. 1.

A main surface of layer 201 is attached to a main surface of layer 202, in order to form a valve arrangement 220, similar to the valve arrangement 120 of FIG. 1. The valve arrangement 220 comprises an inlet check valve 260 and an outlet check valve 270 arranged in a layer arrangement, wherein inlet tunnels of the inlet check valve 260 and an outlet check valve 270 are pointing in opposing directions, similar to the inlet check valve 160 and the outlet check valve 170 of FIG. 1.

The main surface of the valve arrangement 220 is attached to a first surface 285 of a diaphragm arrangement 230 comprising the layer 203 and a first electrode structure 210. The valve arrangement 220 and the diaphragm arrangement 230 are attached so as to form a pump chamber 207 at least at a center region 290 of the micro-pump 200 comprising the inlet check valve 260 and the outlet check valve 270.

The diaphragm arrangement 230 is arranged between the valve arrangement 220 and a stator structure 240. The stator structure comprises the layer 204 and a second electrode structure 211. A first main surface 245 of the layer 204 is insulated by an insulating layer 205. The insulated layer 204 is attached to a second main surface 288 of the diaphragm arrangement 230.

The first surface 245 of the layer 204 comprises a stepwise varying height-profile 209 and at least one anti-stiction bump 208 at a center region 290 of the micro-pump 200 comprising, at least partially, the inlet check valve 260, the outlet check valve 270 and the stepwise varying height-profile 209. The second main surface 288 of the diaphragm arrangement 230 and the first main surface 245 of the stator structure 240 are forming an electrode chamber 212 at the region 290 comprising the stepwise varying height-profile 209.

The first electrode structure 210 and the second electrode structure 211 are forming an electrostatic drive to deflect the diaphragm arrangement 230. The electrode structures may be a separate layer as indicated in FIG. 2 but may also be implemented, for example, by providing a material of at least one layer so as to comprise a conductive material, e. g., a metal material or a doped semiconductor material, including combinations thereof.

When being actuated, a voltage is applied between the first electrode structure 210 and the second electrode structure 211, deflecting the diaphragm arrangement 230 towards the stator structure 240. As the stator structure 240 has a higher stiffness than the diaphragm arrangement 230, the stator structure may be considered as being undeflected whilst the diaphragm arrangement 230 is deflected, e. g., towards the stator structure 240. When the micro-pump 200 is actuated, the diaphragm arrangement 230 is compressing the electrode chamber 212 and expanding the pump chamber 207. The expansion of the pump chamber 207 results in an opening of the inlet check valve 260 allowing a fluid inflow through the inlet check valve 260 from the environment.

Reducing the voltage between the first electrode structure 210 and the second electrode structure 211 may deflect the diaphragm arrangement 230 towards or back to its initial or zero position, resulting in an expansion of the electrode chamber 212 and a compression of the pump chamber 207. The compression of the pump chamber 207 will rise the pressure in the pump chamber 207 and result in an opening of the outlet check valve 270, allowing a fluid outflow from the pump chamber 207 through the outlet check valve 270 to the environment. At the same time, the inlet check valve 260 may block fluid flow through an inlet tunnel by blocking it with a valve flap.

The stepwise varying height-profile 209, similar to the height-profile 107 of FIG. 1, reduces a distance between the first electrode structure 210 and the second electrode structure 211, lowering the needed voltage and/or energy usage to deflect the diaphragm arrangement 230, when compared to a micro-pump with a pump chamber with a constant distance height-profile.

A sticking of the diaphragm arrangement 230 to the stator structure 240 is prevented by the at least one anti-stiction bump 208, which is similar to the anti-stiction bump 105 of FIG. 1. The anti-stiction bumps or additional anti-stiction bumps 208 may be placed on the second surface 288 of the diaphragm arrangement 230, opposing the varying height-profile of the layer 204.

Unlike the micro-pump 100 of FIG. 1, which is configured to pump non-conductive fluids, the electrostatic micro-pump 200 is configured to pump both conductive and non-conductive fluids, because the fluid is not contacting the electrode structures. The pump chamber 110 of FIG. 1 is formed by the first electrode structure 109 and the second electrode structure 108. A conductive fluid in the pump chamber 110 may cause an electrical break-through between the first electrode structure 109 and the second electrode structure 108 of FIG. 1. On the contrary, in FIG. 2, the electrostatic micro-pump 200 is configured to pump both conductive and non-conductive fluids. The first electrode structure 210 and the second electrode structure 211 are forming the electrode chamber 212 while the fluid flows in the pump chamber 207. As there are no fluidical connection between the pump chamber 207 and the electrode chamber 212, the electrostatic micro-pump 200 is able to pump conductive fluids as well.

As explained in a further embodiment, the needed supply voltage and/or the energy usage can be further reduced by a vent opening, which fluidically connects the electrode chamber 212 with an environment allowing a pressure compensation in the electrode chamber 212.

An electrostatic micro-pump may be reasonable, if it is bubble-tolerant, can be produced completely at wafer-level, and can be electrically connected without risking a short circuit. An electrostatic micro-pump comprising a diaphragm is suitable for a practical usage just like a piezoelectrically-driven micro-pump but offering a number of additional advantages when compared to a piezoelectrical micro-pump.

For example, an electrostatic micro-pump with an electrostatic diaphragm has a low energy consumption. The capacity to be charged of the electrostatically-driven micro-pump with a diaphragm may approximately be one order of magnitude smaller than the capacity to be charged of a piezoelectrically-driven micro-pump.

When compared to micro-pumps, built of comparable layer materials and being driven by piezo-ceramic drives, embodiments allow for pumps having a higher temperature stability, as the electrostatic drive has only one temperature expansion for the semiconductor drive, such as the silicon drive, and has no additional temperature expansion for the piezoceramic drive.

The subject-matter of the current disclosure has a high temperature contingent, when compared to a piezoceramic drive, as the electric field force of the electrostatic drive does not change with the temperature. In contrast, the polarization of the piezoceramics disappears as reaching the Curie temperature.

The subject-matter of the current disclosure has a higher mechanical resistance, as the electrostatic drive comprises, for example, ideally elastic monocrystalline silicon, in contrast to the defective multi-crystalline piezoceramics and adhesives.

When compared to micro-pumps being driven by piezoceramic drives, the subject-matter of the current application is easy to manufacture, as the electrostatic drive can be produced by MEMS standard processes in a front-end manufacturing plant.

The subject-matter of the current application can be miniaturized as the electrostatic drive and the physical principles of the electrode-surface may scale independently and advantageously with small distances.

The subject-matter of the current application is economic, as it has low supply chain costs, because the production of the electrostatic drive has few process steps and/or few supply chain participants.

After introducing embodiments of the micro-pump in FIG. 1 and FIG. 2, the production steps of an embodiment of a micro-pump are described by making reference to the following figures.

Figure 3:
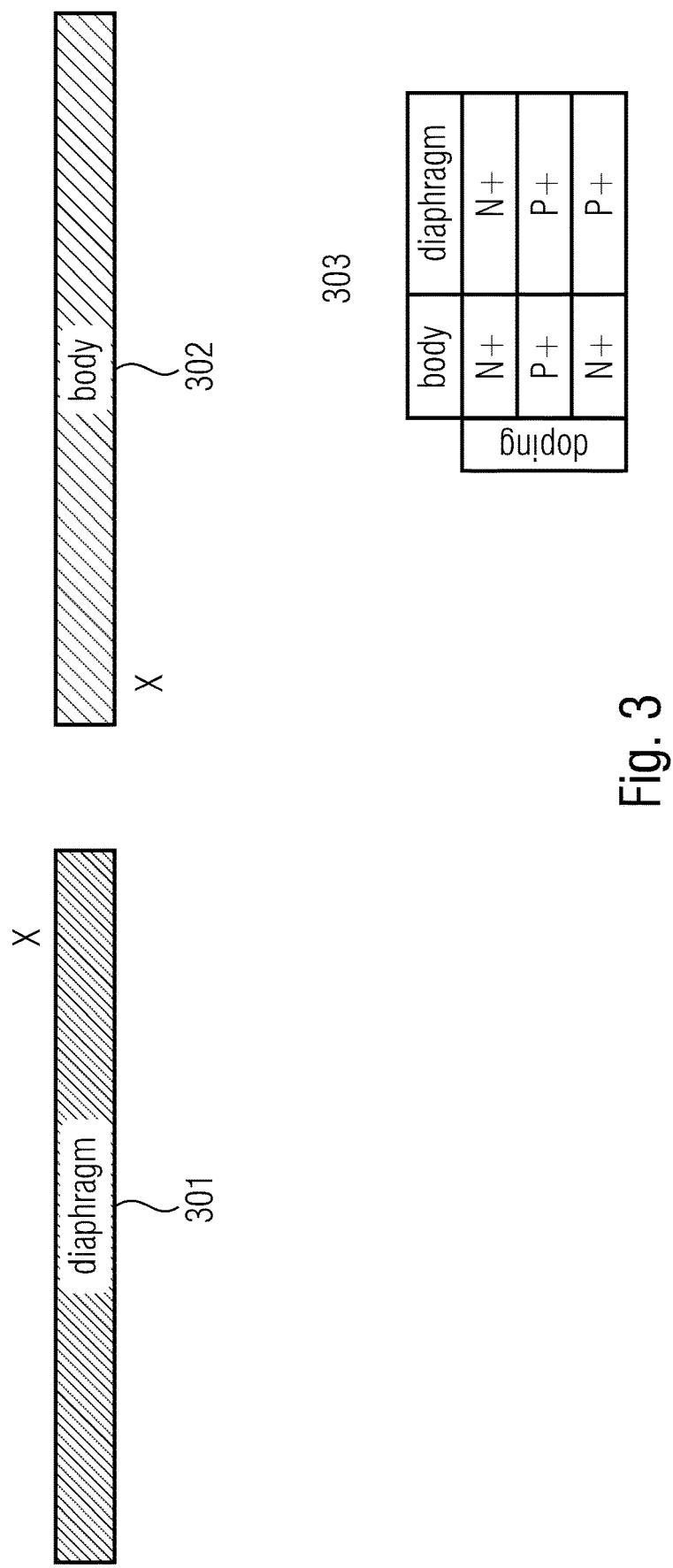
FIG. 3 shows a schematic side view of a first layer and a second layer, provided by a step of manufacturing an electrostatic micro-pump, according to an embodiment.

FIG. 3 shows a schematic side view of a first layer and a second layer obtained by a first step of an embodiment to manufacture an electrostatic micro-pump, such as a micro-pump 200 of FIG. 2. The first step is providing a first layer 301 and a second layer 302. Terms first step, second step and so on do not necessarily indicate a step that is an initial step but is used to differentiate between steps. Likewise, a sequence of the steps is not necessarily limited by such wording.

The first layer 301 may become a diaphragm arrangement, similar to the diaphragm arrangement 230 of FIG. 2, while the second layer 302 may become a stator structure, similar to the stator structure 240 of FIG. 2.

For example, both of the layers may be a part of a wafer, ideally made of a polished monocrystalline silicon, wherein X represents the polished surface of the given layer. Both of the wafers, like silicon wafers, might be P+ or N+ doped as shown in table 303. Accordingly, both layers might be either N+ or P+ doped, or the first layer might be N+ and the second layer might be P+ doped.

Both of the wafers might be, for example, a single-side polished (SSP) 8 inch, highly doped wafer with a thickness of, e. g. 750 μm and a resistivity of, for example, 0.001-0.1 ohm-cm. Markings, such as adjustment- or bondmarkings, for further processes, such as etching processes, might be applied on the polished side of the wafers.

Figure 4:
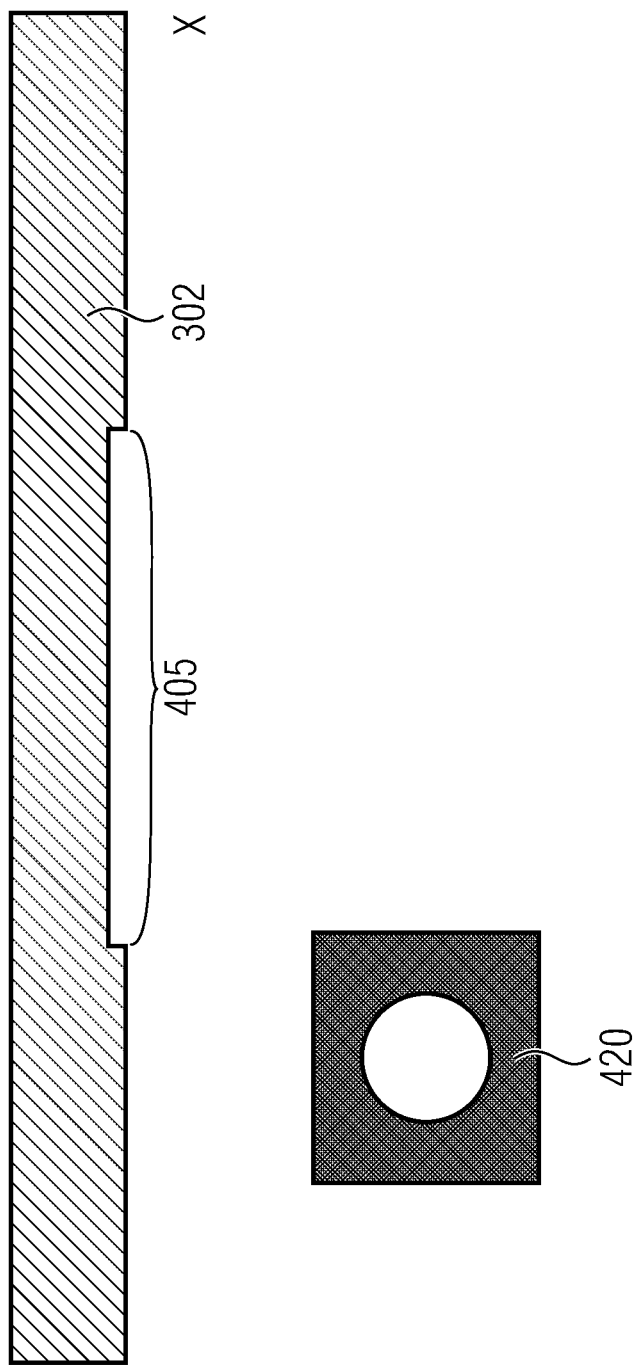
FIG. 4 shows a schematic side view of the second layer that may be obtained when etching the second layer for a first time, according to an embodiment to manufacture a micro-pump and a top view of an etching mask.

FIG. 4 shows a schematic side view of the second layer 302 that may be obtained by etching the second layer 302 for a first time, according to an embodiment to manufacture an electrostatic micro-pump, such as a micro-pump 200 of FIG. 2. FIG. 4 further shows a top view of an etching mask, configured to be used for etching the second layer 302 at the polished main surface.

The second layer is etched at regions 405 of a wafer, which are intended to be center regions of later to be diced micro-pumps, in a depth of, e. g. around 3 μm, e. g., using mask 420 that may have a circular shape to generate a circular pump chamber or step therein. The depth of the etching and/or the geometry of the mask might be different depending on the attributes of the wafer and/or on requirements of the pump, etc. The etched regions 405 serves as a first step of a stepwise varying height-profile similar to the stepwise varying height-profile 209 of FIG. 2.

Figure 5:
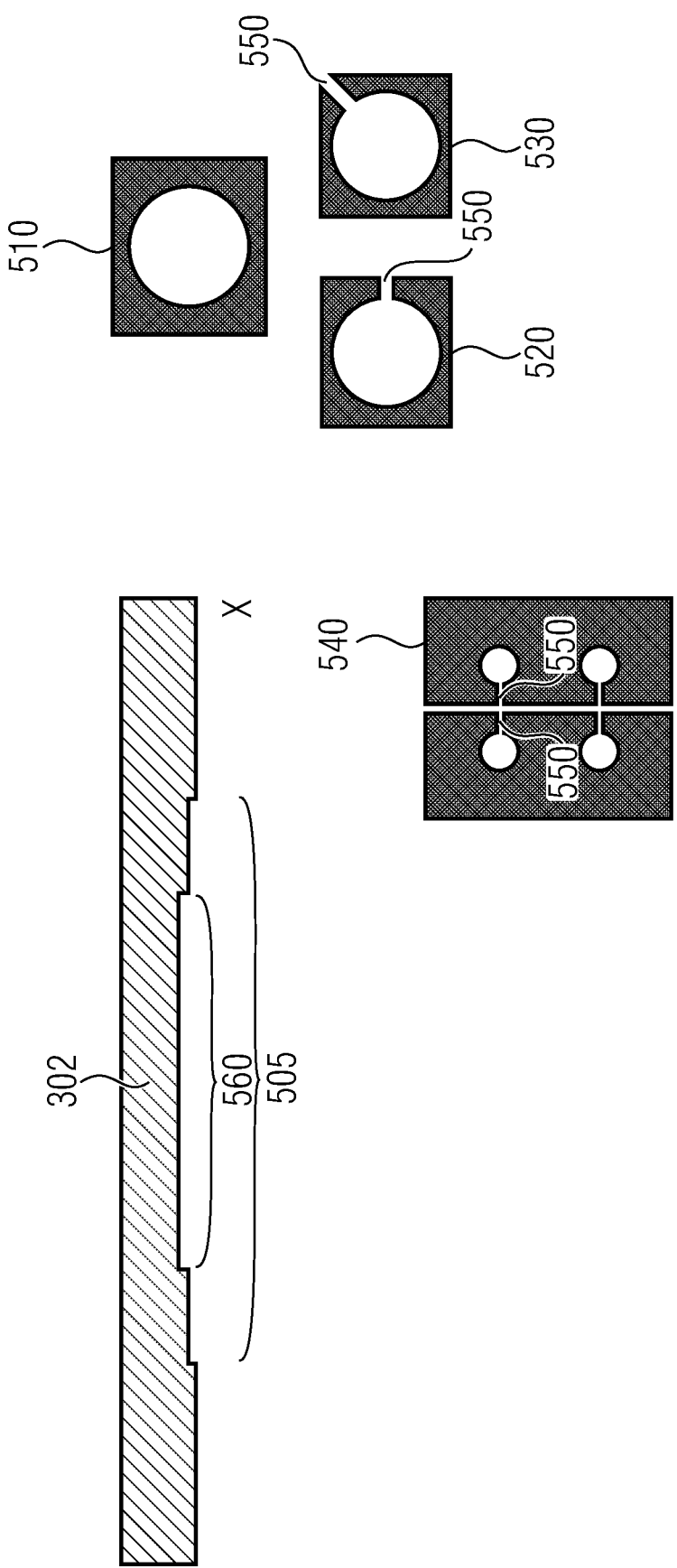
FIG. 5 shows a schematic side view of the second layer that may be obtained when etching the second layer with or without a vent opening for a second time, according to an embodiment to manufacture a micro-pump and a top view of etching masks.

FIG. 5 shows a schematic side view of the second layer 302 that may be obtained by etching the second layer 302 for a second time, according to an embodiment to manufacture an electrostatic micro-pump, such as a micro-pump 200 on FIG. 2. FIG. 5 further shows a top view of various etching masks 510, 520, 530, 540, configured to be used for etching the second layer 302 for a second time.

The second layer 302 of FIG. 4 is etched again on the polished main surface, at regions 505 of the wafer, which are intended to be center regions of the later to be diced micro-pumps, in a depth of around e. g. 3 μm, for example, using a mask 510 with a shape similar to the shape of the mask 420 of FIG. 4, for example with a circular shape. The etched regions 505 and/or the mask 510 have a different diameter than the center region 405 and/or the mask 420 of FIG. 4. The etched regions 505 together with the etched region 405 form a stepwise varying height-profile 560 similar to the stepwise varying height-profile 209 of FIG. 2.

Alternatively, the second layer 302 may be etched on the polished main surface by a mask 520, a mask 530 or a mask 540. The masks 520, 530 and 540 are similar in a way that they are configured to etch or create a circular chamber with a vent opening 550. The vent opening 550 is configured to connect the electrode chamber with an environment of the electrostatic micro-pump.

The etching masks 520 and 530 are showing examples of different angles of the vent opening. The etching mask 540 is configured to etch more than one, for example four, electrode chambers with respective vent openings 550 for creating more than one, for example four micro-pumps. The etching process may use an SPTS non-switching process management. The depth of the etched chamber could vary from wafer to wafer.

Figure 6:
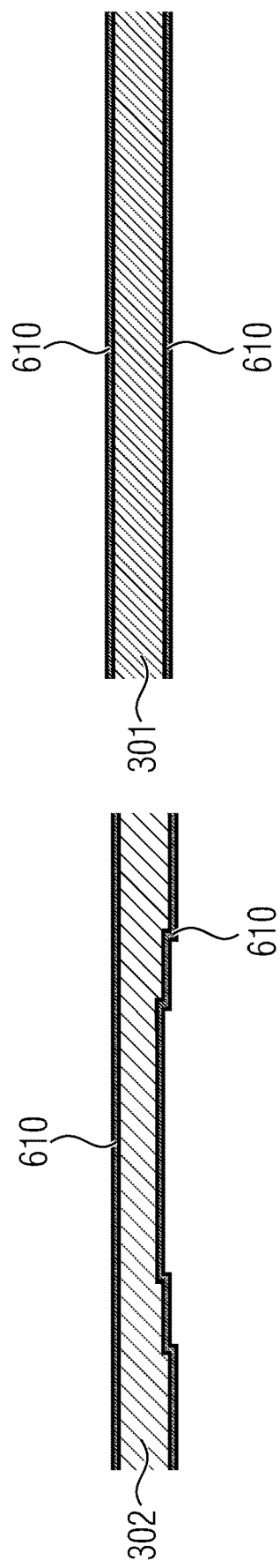
FIG. 6 shows a schematic side view of an insulated first layer and an insulated second layer that may be obtained when oxidizing the first layer and the second layer, according to an embodiment to manufacture a micro-pump.

FIG. 6 shows a schematic side view of an insulated first layer 301 and an insulated second layer 302 that may be obtained by oxidizing the first layer 301 and the second layer 302, according to an embodiment to manufacture an electrostatic micro-pump, such as an electrostatic micro-pump 200 on FIG. 2.

Both layers, the first layer 301 and the etched second layer 302 are oxidized, creating an oxide layer on both of their main surfaces. A target thickness of the oxide layer is, for example, 400 nm, which acts as an insulation layer between the two electrode structures, which prevents an electrical break-through between the electrode structures at a voltage value of, for example, less than 200 V. The oxidation process creates an insulating oxide layer 610, similar to the insulating oxide layer 205 of FIG. 2, on both main sides of the layers 302 and 301.

Figure 7:
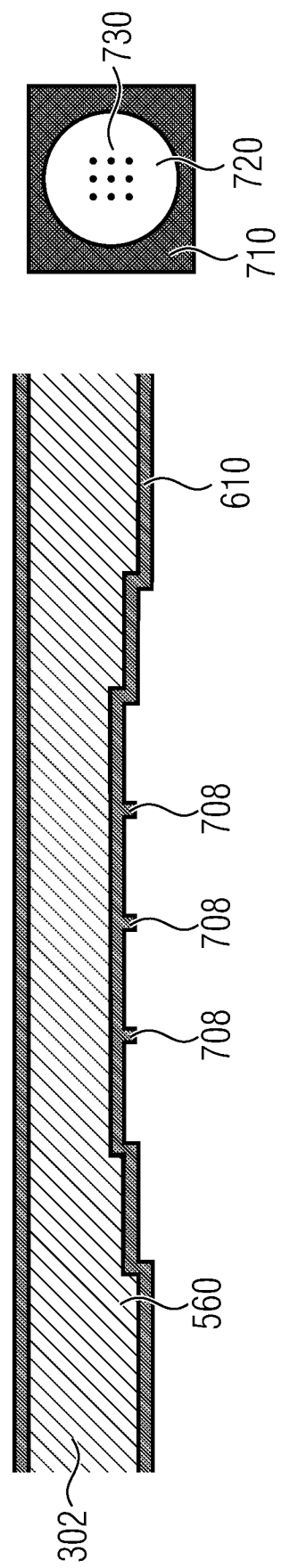
FIG. 7 shows a schematic side view of the insulated second layer with anti-stiction bumps that may be obtained when etching anti-stiction bumps in the insulated second layer, according to an embodiment to manufacture a micro-pump and a top view of an etching mask with a dot pattern.

FIG. 7 shows a schematic side view of the insulated second layer 302 with anti-stiction bumps 708 that may be obtained by etching anti-stiction bumps 708 in the insulating oxide layer 610 on the varying height-profile 560 of the etched second layer 302, according to an embodiment to manufacture an electrostatic micro-pump, such as an electrostatic micro-pump 200 on FIG. 2.

FIG. 7 further shows a top view of an etching mask 710, configured to be used for etching the anti-stiction bumps 708. The etching mask 710 used for etching the anti-stiction bumps 708 comprises a circular profile 720 with a dot pattern 730.

The anti-stiction bumps 708 might be etched by a dry etching process or a wet etching process using KOH, with a very small target depth (e.g. between 20 nm and 200 nm, wherein a target diameter of the anti-stiction pumps 708 is, for example, 20 μm. The anti-stiction bumps 708 are similar to the anti-stiction bumps 208 of FIG. 2.

Figure 8:
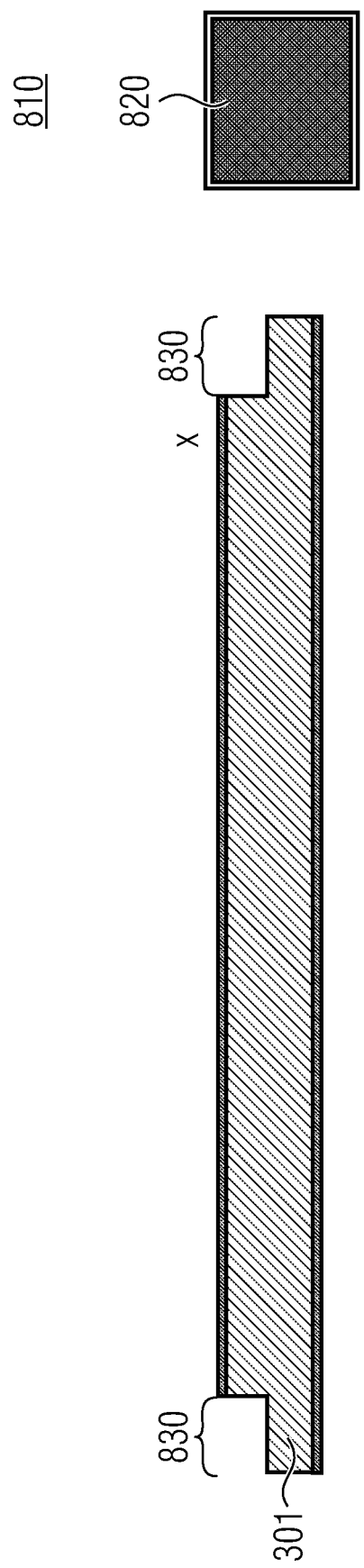
FIG. 8 shows a schematic side view of the insulated first layer that may be obtained when etching away a frame area of the insulated first layer, according to an embodiment to manufacture a micro-pump and a top view of an etching mask with a frame-profile.

FIG. 8 shows a schematic side view of the insulated first layer 301 that may be obtained when etching away a frame area 830 of the insulated first layer 301, according to an embodiment to manufacture a micro-pump, such as a micro-pump 200 of FIG. 2. For Example, the frame area 830 in a depth of, for example, 36 μm on the polished surface of the first layer 301 is etched away by using an etching mask 810 with a frame-profile 820.

Etching away or thinning the frame area 830 of the first layer 301 prepares the first layer for a dicing process. For example, a depth of around 36 μm may be etched by a dry etching process, in a dicing-by-thinning process.

Further, the frame area 830 will provide an insulating gap between the neighboring diaphragm arrangements, allowing the micro-pump to be tested at a wafer level in the manufacturing process.

FIG. 9A and FIG. 9B show a schematic side view of an actuator arrangement that may be obtained when attaching the insulated first layer 301 to the insulated second layer 302, according to an embodiment to manufacture a micro-pump, such as a micro-pump 200 of FIG. 2. FIG. 9A shows a schematic side view of the actuator arrangement at a chip level 910, while FIG. 9B shows a schematic side view of multiple actuator arrangements at a wafer level 940.

The main surface with the stepwise height-profile 560 and with anti-stiction bumps 708 of the second layer 302 is attached to the etched main surface of the first layer 301. The first and second layers 301, 302 are attached by, for example, a wafer bonding at, for example, 1050° C. for, e. g. four hours. The first and second layers 301, 302 are forming an electrode chamber 930, similar to the electrode chamber 212 of FIG. 2.

The first layer 301 and the second layer 302 are bonded together to form the actuator arrangement 920. The two layers 301, 302 are bonded together at the wafer-level 940, wherein the individual chips 910 are not yet diced.

The actuator arrangement 920 may comprise insulating oxide layers 610 on both of its main surfaces.

Figure 10:
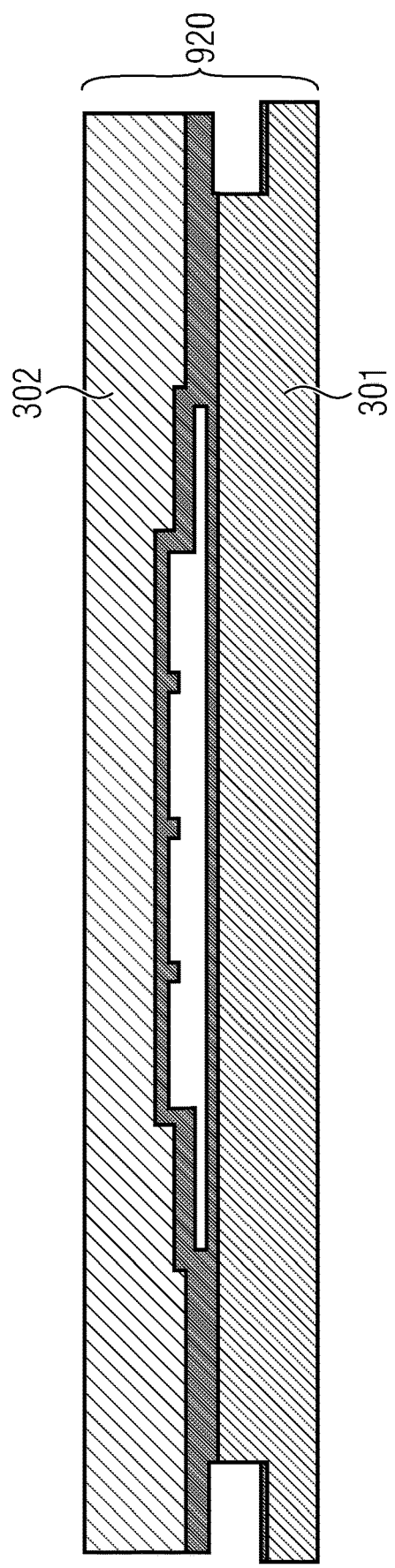
FIG. 10 shows a schematic side view of the actuator arrangement that may be obtained when removing the insulating layers from the main surfaces of the actuator arrangement, according to an embodiment to manufacture a micro-pump.

FIG. 10 shows a schematic side view of the actuator arrangement that may be obtained by removing the insulating layers 610 from the main surfaces of the actuator arrangement 930, according to an embodiment to manufacture a micro-pump, such as the micro-pump 200 of FIG. 2.

The removal of the oxide layer might be conducted by a wet-chemical process, such as a HF-Dip. The removal of the insulating layers of main surfaces of the actuator arrangement 920 allows to form an electrical contact with the first and/or with the second layer 301, 302.

Figure 11:
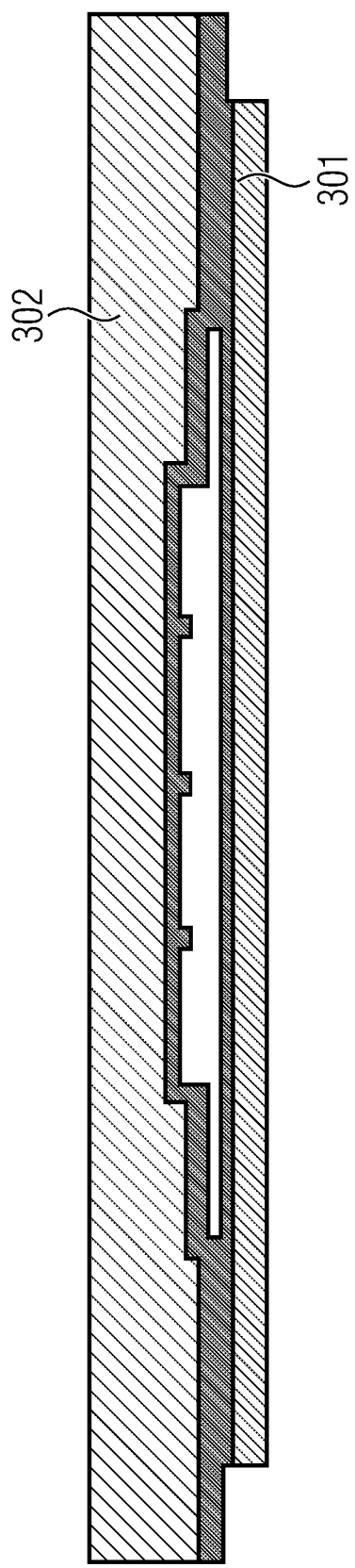
FIG. 11 shows a schematic side view of the actuator arrangement that may be obtained when thinning the first layer of the actuator arrangement, according to an embodiment to manufacture a micro-pump.

FIG. 11 shows a schematic side view of the actuator arrangement 930 that may be obtained when thinning the first layer 301 of the actuator arrangement 920, according to an embodiment to manufacture a micro-pump, such as the micro-pump 200 of FIG. 2. In order to create a diaphragm from the first layer 301, that is make the layer 301 deflectable and mechanically stable enough not to break when being deflected, the thickness of the first layer 301 is reduced. For example, the first layer 301 may be thinned from, e. g. 750 µm to, e. g. 30 µm.

For example, a thinning process might be conducted by grinding the first layer 301 from 750 µm to 100 µm and then applying a chemical-mechanical polishing (CMP) to arrive at a thickness of e. g. 50 µm. The remaining e. g. 20 µm might be etched away by dry etching. The first layer 301 becomes the diaphragm, having a thickness in a same range of the thickness of the diaphragm arrangement 230 of FIG. 2.

If the diaphragm created out of the first layer 301 is a non-conductive diaphragm, a deposition of an electrode structure on the diaphragm is recommended.

Figure 12:
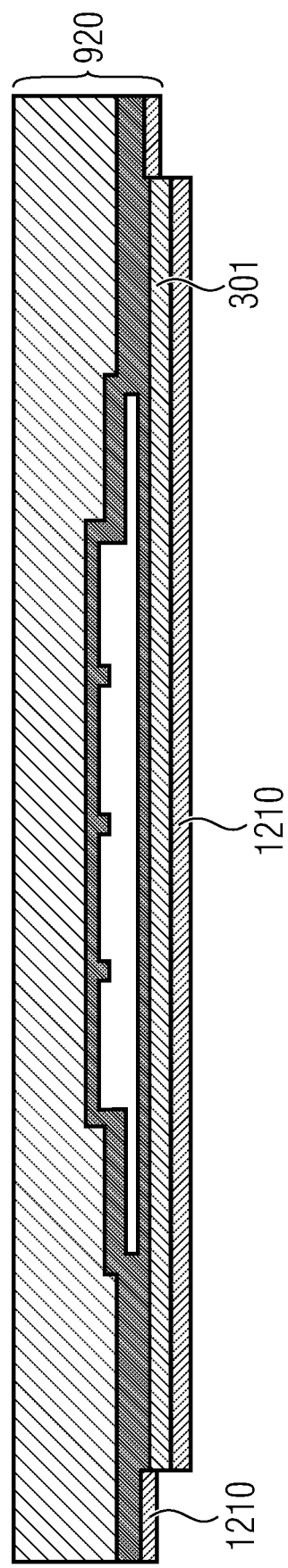
FIG. 12 shows a schematic side view of the actuator arrangement that may be obtained when depositing a conductive material on a main surface with the first layer of the actuator arrangement, according to an embodiment to manufacture a micro-pump.

FIG. 12 shows a schematic side view of the actuator arrangement 920 that may be obtained by depositing a conductive material 1210 on a main surface with the first layer 301 of the actuator arrangement 920, according to an embodiment to manufacture a micro-pump, such as the micro-pump 200 on FIG. 2.

The deposition may be conducted by, for example, sputtering a conductive material 1210, such as aluminum, on the surface with the diaphragm made from the first layer 301 of the actuator arrangement 920. The conductive material 1210 may act as the second electrode structure 210 of the diaphragm arrangement 230 of FIG. 2.

Figure 13:
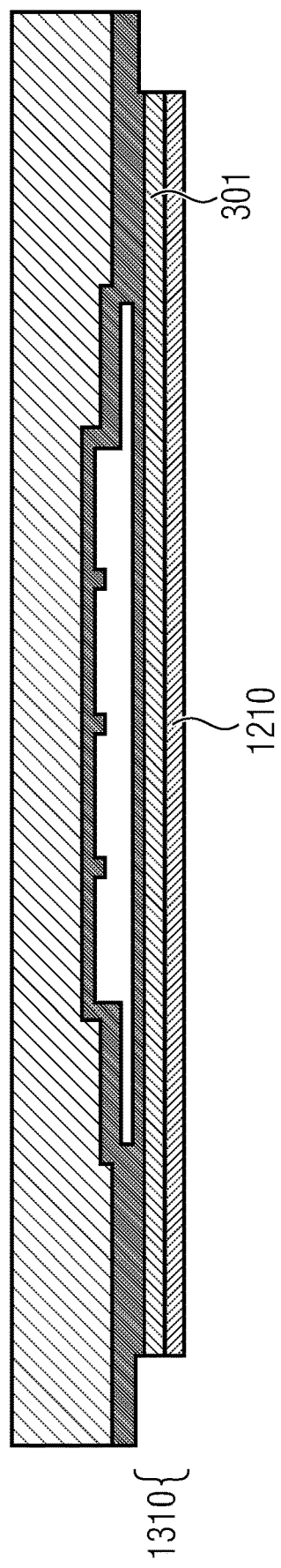
FIG. 13 shows a schematic side view of the actuator arrangement that may be obtained when removing the conductive material from a peripheral region, according to an embodiment to manufacture a micro-pump.

As the sputtering process may deposit conductive material 1210 all over the surface of actuator arrangement 920 and not just over the diaphragm made from the first layer 301, the conductive material 1210 between the diaphragms is preferred to be removed as shown in FIG. 13.

FIG. 13 shows a schematic side view of the actuator arrangement that may be obtained by removing the conductive material from a peripheral region of a micro-pump not comprising a diaphragm, according to an embodiment to manufacture a micro-pump, such as the micro-pump 200 on FIG. 2.

The removal of the conductive material 1210 from a peripheral region, of a later to be diced micro-pump, that is between the diaphragms made from the first layer 301 is insulating the diaphragm from neighboring diaphragms. The removal of the conductive material may be conducted by spray-coating and wet chemical etching.

The first layer 301 and the conductive layer 1210 are forming a diaphragm arrangement 1310, similar to the diaphragm arrangement 230 of FIG. 2 formed by the layer 203 and the second electrode structure 210.

Figure 14:
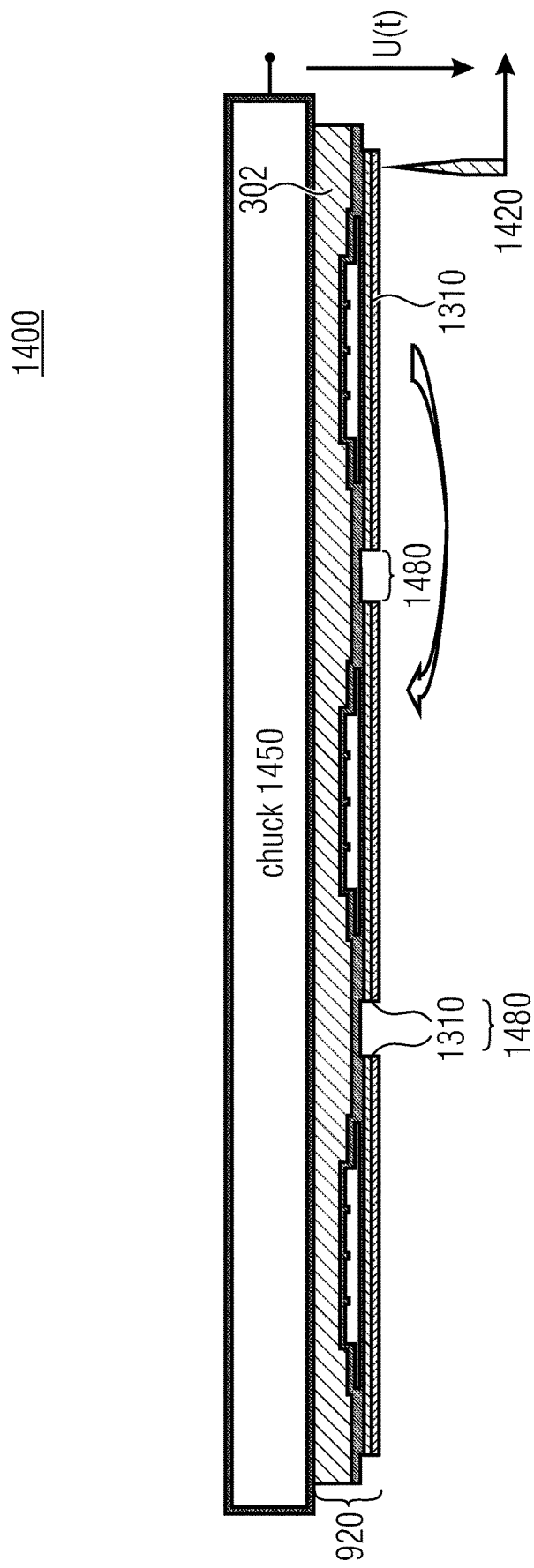
FIG. 14 shows a schematic side view of a wafer testing arrangement, configured to test an actuator arrangement, according to an embodiment.

The diaphragm arrangements 1310 may be insulated from neighboring diaphragm arrangements 1310, allowing a testing at the wafer-level in a wafer testing arrangement 1400 as shown in FIG. 14. For example, trenches may be formed that may result in the remains 195 and/or 295.

FIG. 14 shows a schematic side view of a wafer testing arrangement 1400, configured to test an actuator arrangement 920 at a wafer level. The testing arrangement 1400 comprises a chuck 1450, configured to hold the actuator arrangement 920 while testing. The testing arrangement 1400 further comprises a probe 1420, or wafer probe, configured to test the actuator arrangements 920.

The testing comprises attaching the second layer 302 of the actuator arrangement 920 to the chuck 1450, wherein the actuator arrangement 920 comprises a wafer of the second layer 302 and multiple diaphragm arrangements 1310.

The testing further comprises placing the probe 1420 one by one on the diaphragm arrangements 1310 and testing or probing the actuator arrangements 920 by applying a test voltage on the actuator arrangements 920 or on the diaphragm arrangements 1310.

The diaphragm arrangements 1310 are insulated from neighboring diaphragm arrangements 1310 by insulating gaps 1480 at peripheral regions of later to be diced micro-pumps, which do not comprise diaphragm arrangements 1310.

Sidewall insulation or the insulating gap 1480 may be considered as an essential feature of the inventive micro-pump. The sidewall insulation is the insulation between two electrode surfaces and/or a frame around at least one electrode surface, which is produced by etching a separation and by a subsequent layer conversion, like oxidation, and/or by depositing an insulation layer, using physical and/or chemical processes, e.g. PECVD, PVD.

The insulation and separation of the actuators or the diaphragm arrangements 1310, has the benefit of speeding up the production process and allows testing by wafer-level-based measurement.

The electrostatic micro-pump differs from a known micro-pump, in which an insulation from neighboring diaphragm arrangements 1310 is neglected. In the present embodiment, such as the micro-pump 100, an insulation from the neighboring diaphragm arrangements 1310 is implemented. An insulation from neighboring diaphragm arrangements 1310 can also be implemented in a slightly modified form in the manufacturing of a micro-pump for conductive liquids, such as the micro-pump 200 of FIG. 2.

The above-described manufacturing of the actuator arrangements 920 produces a so-called short-loop variant of the actuator arrangements 920. Alternatively, there is a full-loop variant of the actuator arrangements 920. A part of manufacturing a full-loop variant is shown in FIGS. 15A-C.

Figure 15B:
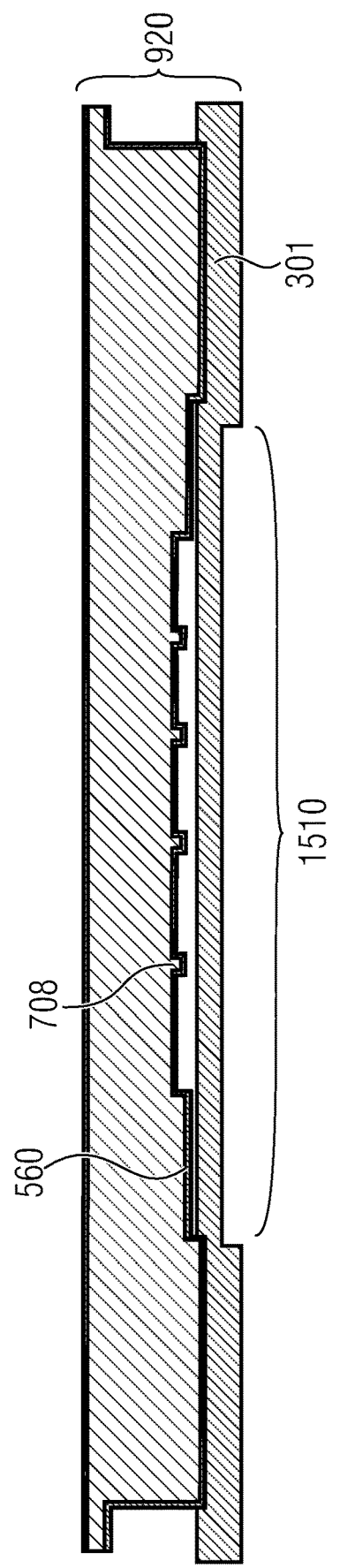
FIG. 15B shows a schematic side view of a full-loop variant of the actuator arrangement, according to an embodiment.
Figure 15C:
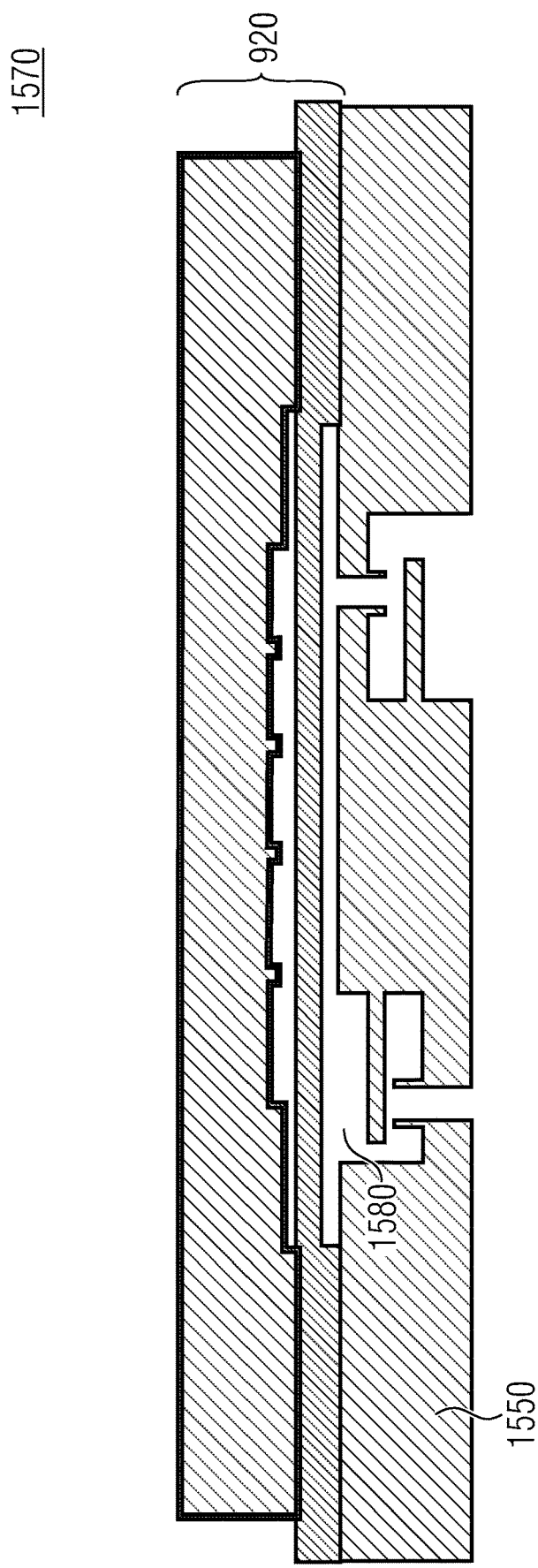
FIG. 15C shows a schematic side view of a micro-pump, according to an embodiment.

FIG. 15A shows a schematic side view of the actuator arrangement 920 formed by attaching the main surface with the stepwise high-profile 560 and the anti-stiction bumps 708 of the second layer 302 attached to the first layer 301. The second layer 302 may be already diced as shown in FIG. 15A or is prepared for dicing by thinned frame area, as shown in FIG. 15B.

FIG. 15B shows a schematic side view of a full-loop variant of the actuator arrangement 920, wherein the first layer 301 is thinned in a full region and further thinned at a region 1510 of the stepwise height-profile 560. The first layer 301 may comprise a conductive material. The etching 1510 defined the pump chamber height, if the voltage is not applied and the diaphragm is pressure balanced. To achieve a good compression ratio of the micro-pump, and to make the pump bubble tolerant, this pump chamber height should be chosen very small. This height (depth of 1510) can be considered as an important design parameter of the electrostatic micro-pump. If a high bubble tolerance or a high gas back pressure is required, this pump chamber height can be chosen very small (depending on the etching technology, e.g. dry etching od KOH etching). E.g. 50 nanometer to 1 µm.

The drawback of a small pump chamber height is a higher fluidic resistance in the pump chamber. For that, if a higher flow rate of the fluid (liquid or gas) is required, the pump chamber height 1510 can be chosen larger, more than 1 µm up to 20 µm, depending on the actuator stroke. The higher the pump chamber, the smaller the fluidic resistance, the higher the pump rate, but also the compression ratio and the bubble tolerance is decreasing.

FIG. 15C shows a schematic side view of a micro-pump 1570. Producing a micro-pump 1570, similar to the micro-pump 200 of FIG. 2, is obtained by attaching a valve arrangement 1550 to the actuator arrangement 920. The pump chamber 1580 of the micro-pump 1570 is formed by the double etched region 1510 and by the valve arrangement 1550.

Some differences between the short-loop and full-loop variants can be recognized. In the short-loop variant the diaphragm made from layer 301 is diced and/or is insulated from neighboring diaphragms, while in the full-loop variant the stator structure is diced and/or is insulated from neighboring stator structures.

Further, in the full-loop variant the pump chamber 1580 is etched into the first layer 301, whereas in the short-loop variant there is no need to do so, the pump chamber is formed by the diaphragm arrangement and the valve arrangement.

Moreover, in the full-loop variant the actuator arrangement 920 is attached, for example is bonded, to the valve arrangement, whereas in the short-loop variant there is no need to do so.

FIG. 16 shows a table of simulated, possible implementations of the electrostatically driven micro-pump designs. The exemplary simulated implementations are not limiting the invention, electrostatically driven micro-pumps can be produced in a huge range of chip sizes. FIG. 16 shows simulation results for different chip sizes, from 10×10 mm$^2$ down to 1×1 mm$^2$. The pump chamber as well as the actuation chamber are round, having a minimum distance of 100 µm to the square chip edge. Although the results are explained in connection with quadratic chip sizes, the chips may have different aspect ratios of their sides, e.g., differing from 1:1, e.g., a rectangular form. Alternatively any other shape such as elliptical or circular or differing therefrom may be implemented.

Possible values of significant attributes of an electrostatically driven micro-pump design is listed below:

| Attribute | Range from | Range to |
| --- | --- | --- |
| Stroke volume | 1 nl | 149 nl |
| Blocking pressure of the actuator | 28 kPa | 53 kPa |
| Switch/Snap voltage | 133 V | 184 V |
| Max air back pressure relative to atmosphere | 8.2 kPa | 13 kPa |
| Min air back pressure relative to atmosphere | −34.9 kPa | −4.7 kPa |
| Thickness of diaphragm | 0.000005 m | 0.00012 m |
| Chip size | 0.001 m | 0.01 m |
| Distance to chip border | 0.0001 m | 0.001 m |
| Radius of the diaphragm | 0.0001 m | 0.0049 m |
| Plate stiffness | 0.0000018 Nm | 0.025 Nm |
| Pump chamber height | 0.0000001 m | 0.000001 m |

For calculating the dead volume of the valve units, data of an established piezo micro-pump (which are KOH etched) has been used. For chip sizes below 3×3 mm$^2$ dry etched valves has been assumed, which have lower dead volume.

In this simulation, the diameter and the thickness of the design was adapted to have a blocking pressure of about 30-53 kPa. Switching voltage and blocking pressure have been compared to a reference design, which has been realized already at Fraunhofer EMFT. The actuation gap chamber height has been chosen to be 5 µm for all designs, it can be varied to higher or lower values, with higher and lower switching voltages and stroke volumes, respectively.

One relevant outcome of the simulation is the minimum and maximum air pressure, which the pump can achieve due to the compression ratio and the stiffness of the actuation diaphragm. This theory is adapted in this simulation for electrostatic driven pumps.

Considering the capillary pressure of the valves, it can be estimated that a bubble tolerant micro-pump should have an air back pressure of nearly 10 kPa or more than 10 kPa. With that, according the table above, it can be concluded, that with electrostatic actuation micro-pumps with a chip size down to 1.5×1.5 mm$^2$ can be realized, which are not only pumping liquids and gases but also be bubble tolerant. With an optimized actuation chamber (not yet implemented in the simulation) this goal may also be achieved with the 1×1 mm$^2$ design.

An electrostatically micro-pump with a chip size of 2×2 mm$^2$ or below is a huge step towards a low cost, sustainable and disposable device, which can be used e.g. in disposable lab-on-chip systems or in smart electronic drug pills:

Low Cost: on an 8 inch wafer nearly 8000 devices of a 2×2 mm$^2$ pump can be realized, for that the manufacturing cost at very high quantities, such as >100 wafer starts per week, drops down below 10 cent, which is advantageously cheap. Additionally, no pick & place and no gluing is required any more for this pump, as no piezo element is used.

Sustainable, disposable device: a silicon micro-pump which consists just on a stack of silicon layers is completely free of poisonous materials, like lead in piezo PZT. Silicon and silicon oxide consists to the same material as sand, a very thin metal layer like gold or aluminum on it. With that, it is no problem to put this device to a waste, it is a complete sustainable component.

Figure 17:
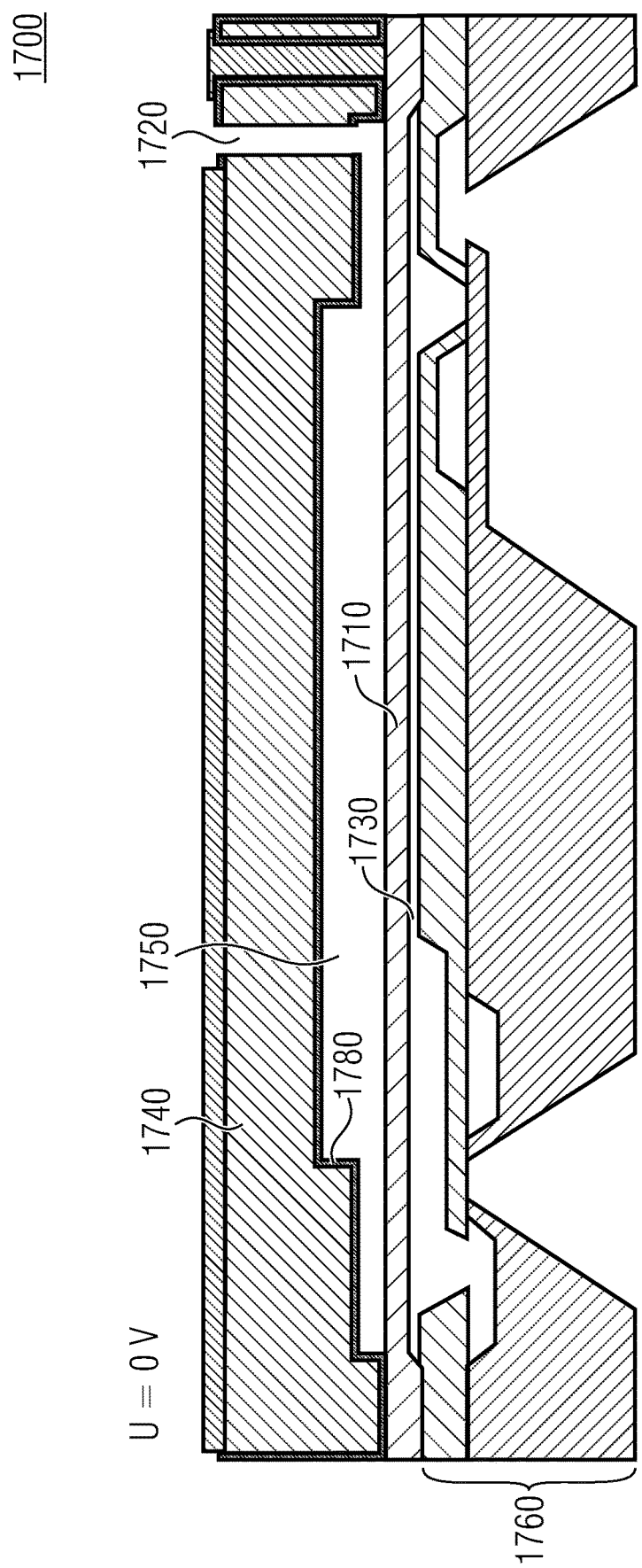
FIG. 17 shows a schematic side view of a micro-pump with a vent opening, according to an embodiment.

FIG. 17 shows a schematic side view of a micro-pump 1700, similar to the micro-pump 200 of FIG. 2, with a vent opening 1720. The micro-pump comprises a valve arrangement 1760, a diaphragm arrangement 1710 and a stator structure 1740. A main surface of the valve arrangement 1760 is attached to a main surface of the diaphragm arrangement 1710 forming a pump chamber 1730. The main surface of the diaphragm arrangement opposing the pump chamber is attached to the stator structure 1740. The stator structure comprises a stepwise varying height-profile 1780 and a vent opening 1720. The diaphragm arrangement 1710 is between the valve arrangement 1760 and the stator structure 1740. The diaphragm arrangement is forming an electrode chamber 1750 with the stator structure 1740. The vent opening 1720 of the stator structure 1740 is connecting the electrode chamber 1750 with an environment.

An advantage of the vent opening 1720 is that the pressure in the electrode chamber 1750 is the ambient pressure, that is a zero position of the diaphragm does not depend on, for example, fluctuations of an atmospheric pressure.

A further advantage of the vent opening is a flat diaphragm. If the height of the pump chamber were zero, a maximum compression ratio would be achieved. However, a certain pump chamber height is necessary, otherwise there would be a very high flow resistance in the pump chamber.

Advantages of the vent opening comprise the fact that the diaphragm is pressure-balanced, the atmospheric pressure does not change the zero position of the diaphragm, a high compression ratio can be achieved by a flat diaphragm, and no back pressure is generated in the electrode chamber as the diaphragm moves.

However, the usage of the vent opening may lead to a risk of contamination during manufacturing, processing, sawing, and/or by the operation. The contamination may appear in the form of particle transport or bellows particle transport or in the form of condensed moisture. FIG. 18 shows design measures applied to avoid the disadvantages of the vent opening. The design measures applied in FIG. 18 can be applied separately or combined.

Figure 18A:
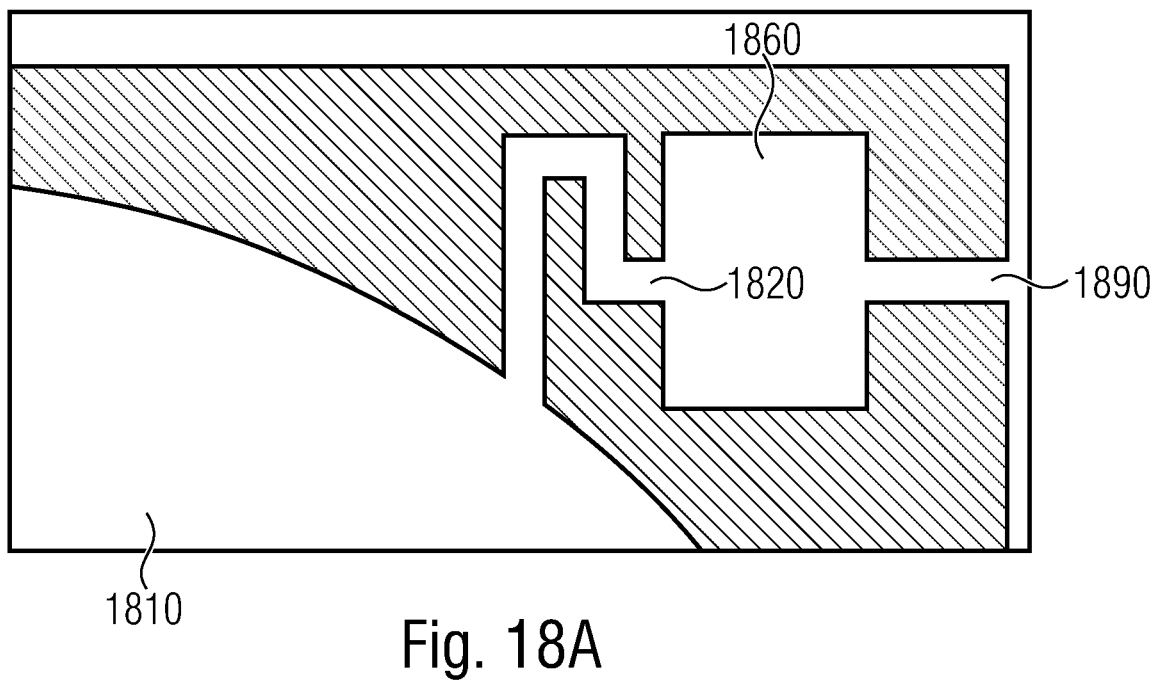
FIG. 18A shows a schematic top view of a vent opening with a buffer volume and a capillary stop, according to an embodiment.

FIG. 18A shows a schematic top view of a vent opening with a capillary stop. The electrode chamber 1810 is connected to the environment through a vent opening 1890, wherein the vent opening comprises a capillary stop 1820 combined with a buffer volume 1860.

Figure 18B:
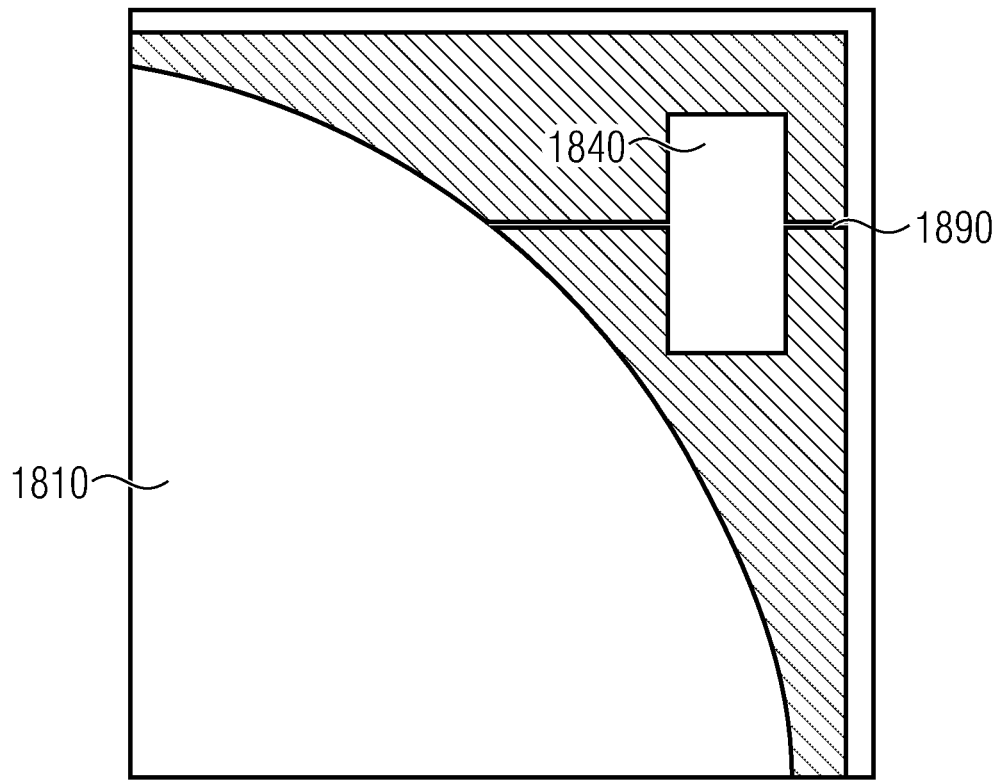
FIG. 18B shows a schematic top view of a vent opening with a reduced the cross-section, according to an embodiment.
Figure 18C:
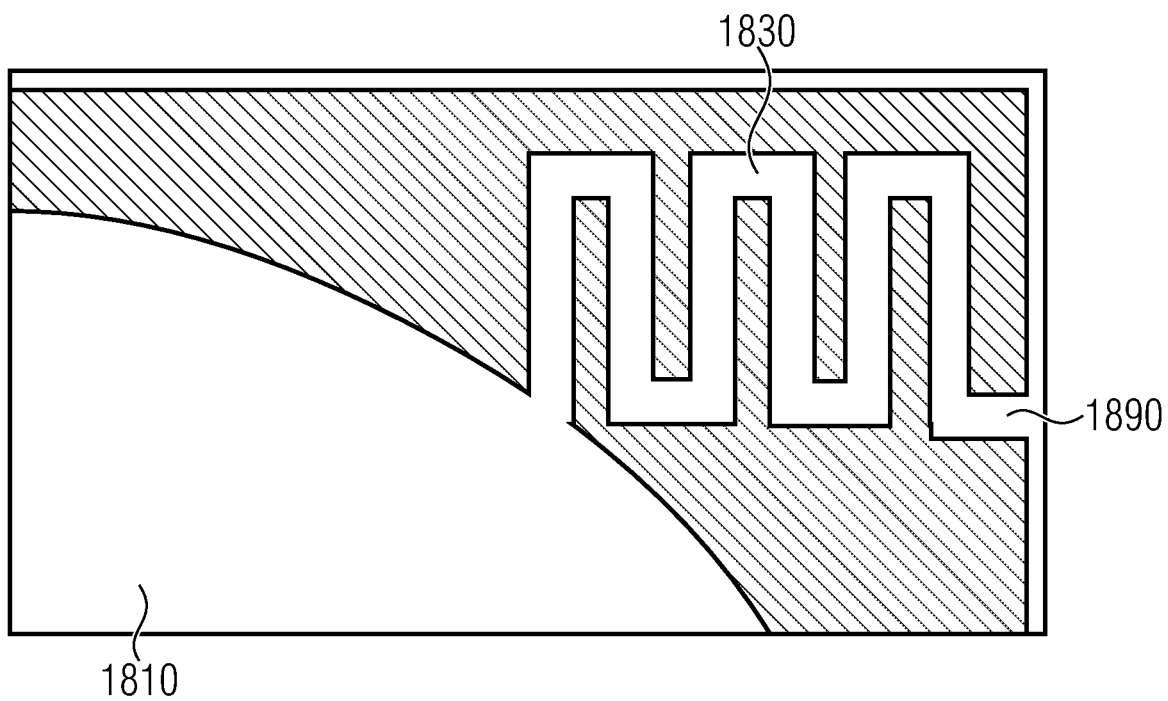
FIG. 18C shows a schematic top view of a vent opening with a meander, according to an embodiment.

The measures of FIGS. 18B and 18C are increasing a flow resistance of the vent opening 1890 so that no significant airflow can flow through the vent opening and no particles can be sucked in during the stroke times in which the diaphragm moves. Stroke times might be between 1 ms and 100 ms depending on a pump design and a viscosity of the medium.

FIG. 18B shows a schematic top view of a vent opening with a reduced the cross-section. The flow resistance is increased mainly by reducing a cross-section 1840 of the vent opening.

FIG. 18C shows a schematic top view of a vent opening with a meander. The flow resistance is increased by increasing a venting distance, applying a meander 1830.

Figure 18D:
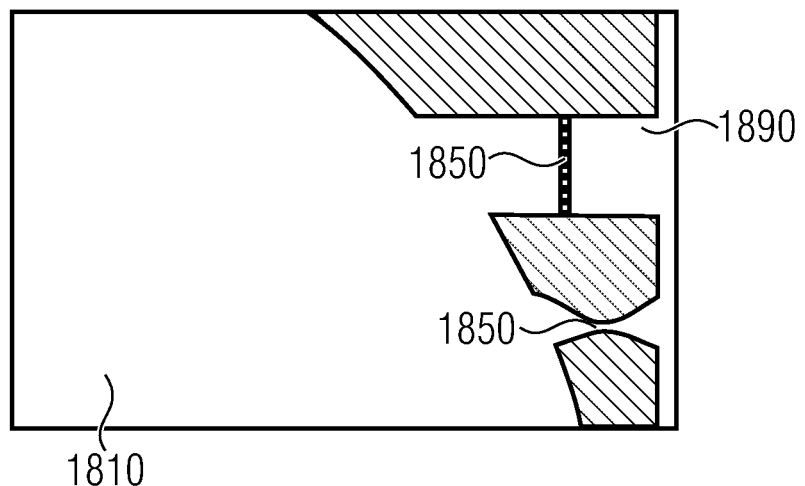
FIG. 18D shows a schematic top view of a vent opening with a filter, according to an embodiment.

FIG. 18D shows a schematic top view of a vent 1890 opening with a filter. A lateral filter 1850 is provided in the vent opening 1890, which might be one of the simplest measures against particles.

Figure 18E:
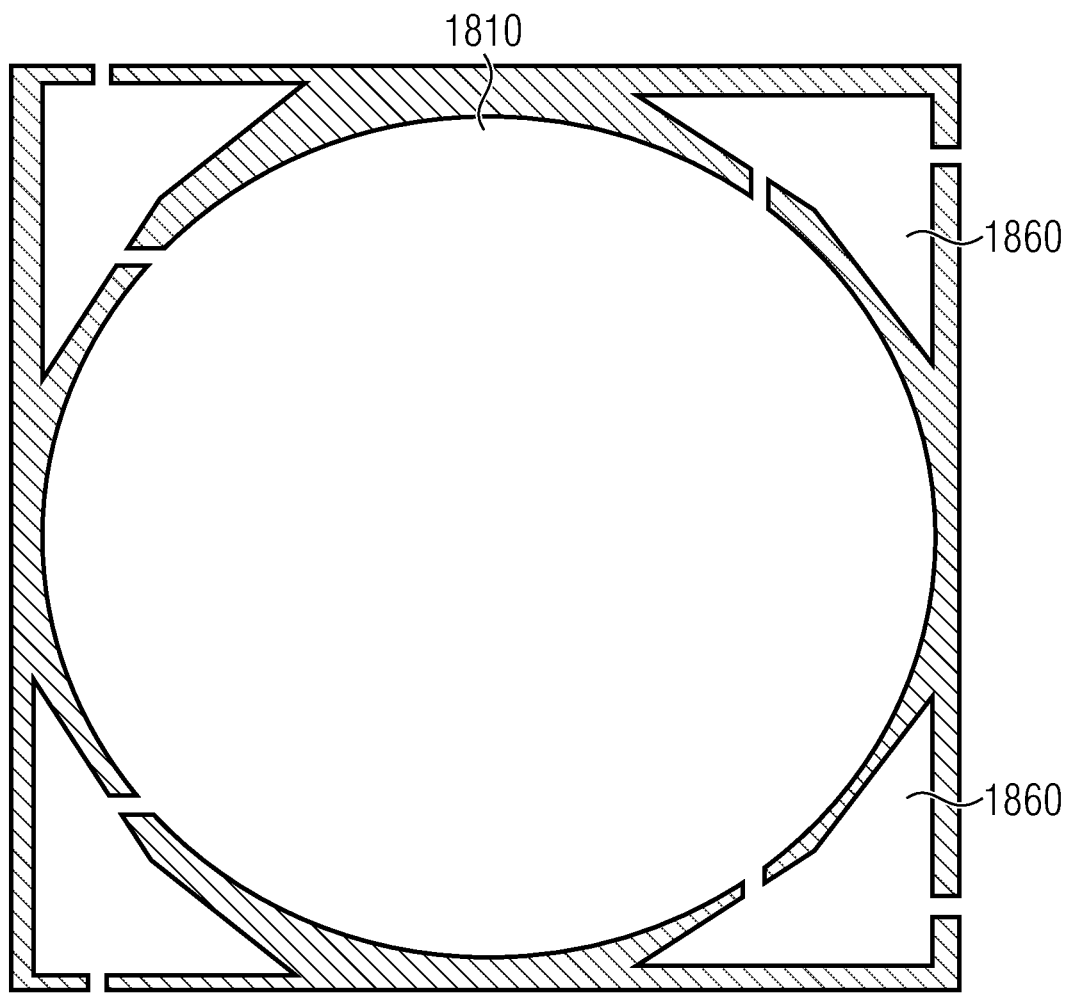
FIG. 18E shows a schematic top view of a vent opening with buffer volumes, according to an embodiment.

FIG. 18E shows a schematic top view of a vent opening or an electrode chamber 1810 with buffer volumes 1860, which are considerably larger than a stroke volume, for example, with four buffer volumes. In this case, there is no direct volume exchange with the environment, the ambient air only enters the buffer volume 1860. The buffer volume may be realized by depth etching in a counter-electrode or in a non-moving electrode structure.

It is also possible to combine structures discussed in FIG. 18. These structures may be also realized laterally by dry etching a vent opening facing perpendicular to the layers of a micro-pump. Holes perpendicular to layers can be covered by foil, while lateral holes might be contaminated by the sawing, dicing process.

For example, a vent opening with a diameter of 1 µm, with a capillary stop widening in-between, would probably considerably reduce the risk of contamination. At the same time, for example, the narrow hole with a diameter of 1 µm prevents particles over 1 µm from entering the electrode chamber. The main advantages of the vent opening, such as flat diaphragm, high compression ratio and compensation of atmospheric pressure selections, would be given.

Further, an overpressure that builds up in an electrode chamber during rapid movements can be used, if the pumping frequency is high enough, to increase the back pressure capability of the micro-pump.

Figure 19A:
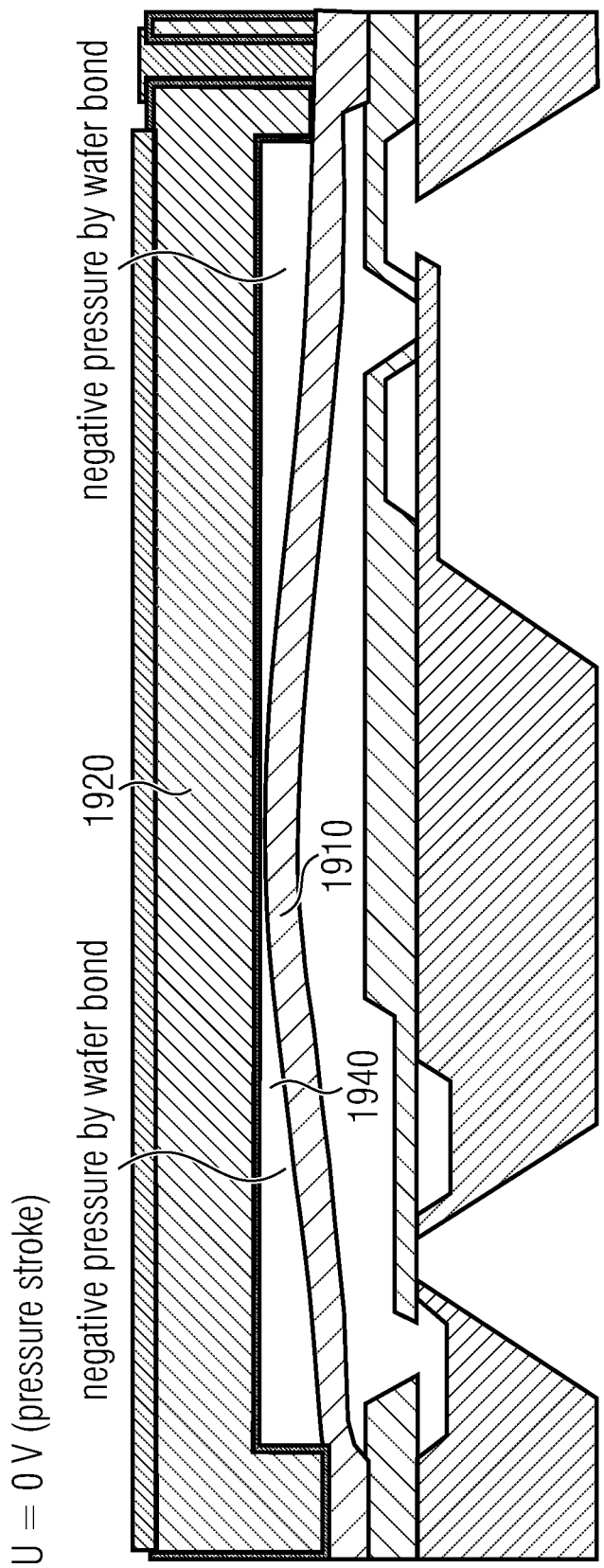
FIG. 19A shows a schematic side view of a micro-pump with a pre-deflected diaphragm, according to an embodiment, in a non-actuated state.
Figure 19B:
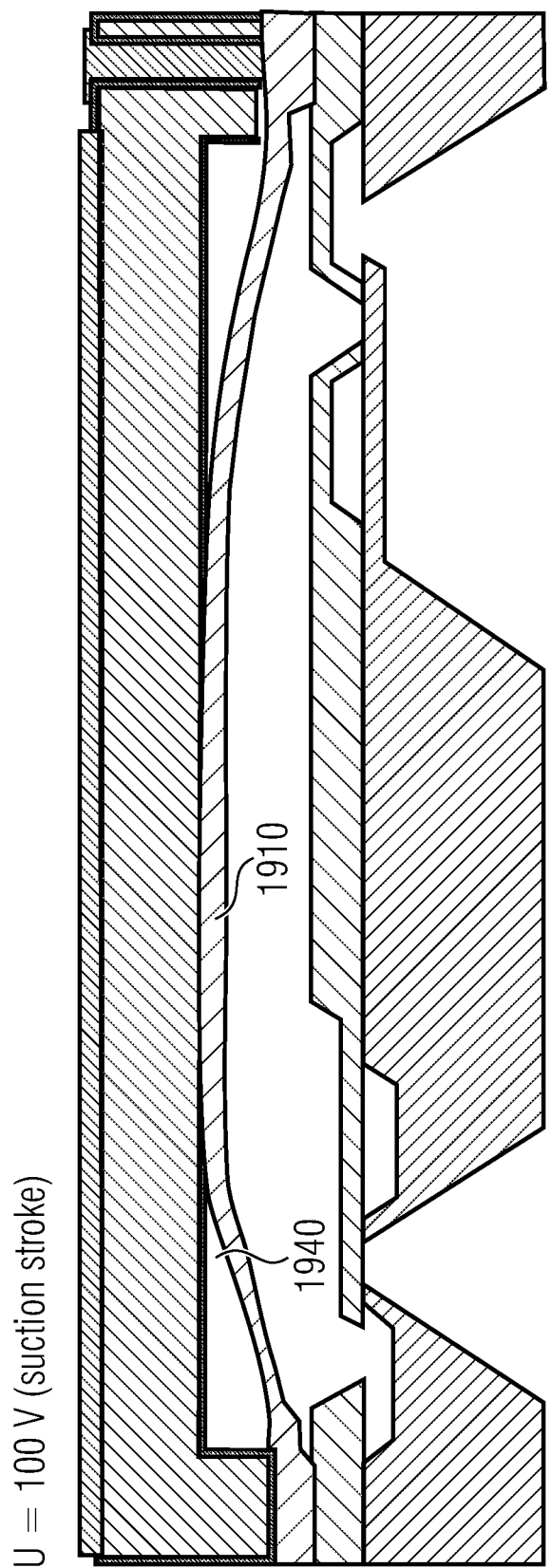
FIG. 19B shows a schematic side view of a micro-pump with a pre-deflected diaphragm, according to an embodiment, in an actuated state.

FIG. 19 shows a schematic side view of a micro-pump similar to the micro-pump of FIG. 2 with a pre-deflected diaphragm 1910 in a non-actuated state, shown in FIG. 19A, and in an actuated state, shown in FIG. 19B.

In FIG. 19A the distance between the pre-deflected diaphragm 1910 and a stator structure 1920 is minimal in a center region of an electrode chamber. In some cases, the pre-deflected diaphragm 1910 may touch the stator structure 1920. The stator structure 1920 does not comprise a vent opening. The deflection of the diaphragm 1910 is provided due to negative pressure during wafer bonding. A vacuum during the wafer bonding together with a plate stiffness of the diaphragm 1910 can be used to adjust a rate of deflection of the diaphragm 1910 in a defined manner. It is important to note that by a clever selection of the pressure ratio between the pressure of the electrode chamber and the atmospheric pressure as well as the selection of the surface and thickness of the diaphragm, a pre-deflection can occur, but the touching is only established by actuating the diaphragm. In this case the operating voltage is slightly higher, but with a slightly higher stroke volume, when compared to a micro-pump, where the pre-deflected diaphragm touches the stator structure in a non-actuated state.

This results in the benefit of no vent opening being required, that means no risk of particle contamination, neither during processing, such as slurry from polishing, nor during dicing, such as saw dust penetrates through capillary forces, nor during operation in air, there are no bellows particles to suck air in and out, nor under special operating conditions such as moisture droplets penetrating into the vent opening.

Further benefits of pre-deflecting a diaphragm 1910 by a negative pressure during wafer bonding, is a curved bending line. The curved bending line creates a geometric wedge 1940 with a sectionally flat stator structure, creating a wandering wedge effect and reducing a driving voltage.

As shown in FIG. 19B, when actuating the micro-pump, the diaphragm 1910 may be attracted towards the stator structure 1920, resulting in that the diaphragm arrangement 1910 touches the stator structure 1920 at a center region and the wedge 1940 is wandering from the center region to a peripheral region.

It has to be taken into account during planning or designing a pre-deflected diaphragm, that a diaphragm being pre-deflected by use of vacuum or low pressures, the diaphragm is so strongly deflected that it leaves the Hook area of the plate theory and it becomes stiffer.

The vacuum or pressure during the bonding process can be used to adjust the pre-deflection and, if necessary, the shape of the electrode chamber can be adjusted by the plate stiffness of the diaphragm.

Figure 20:
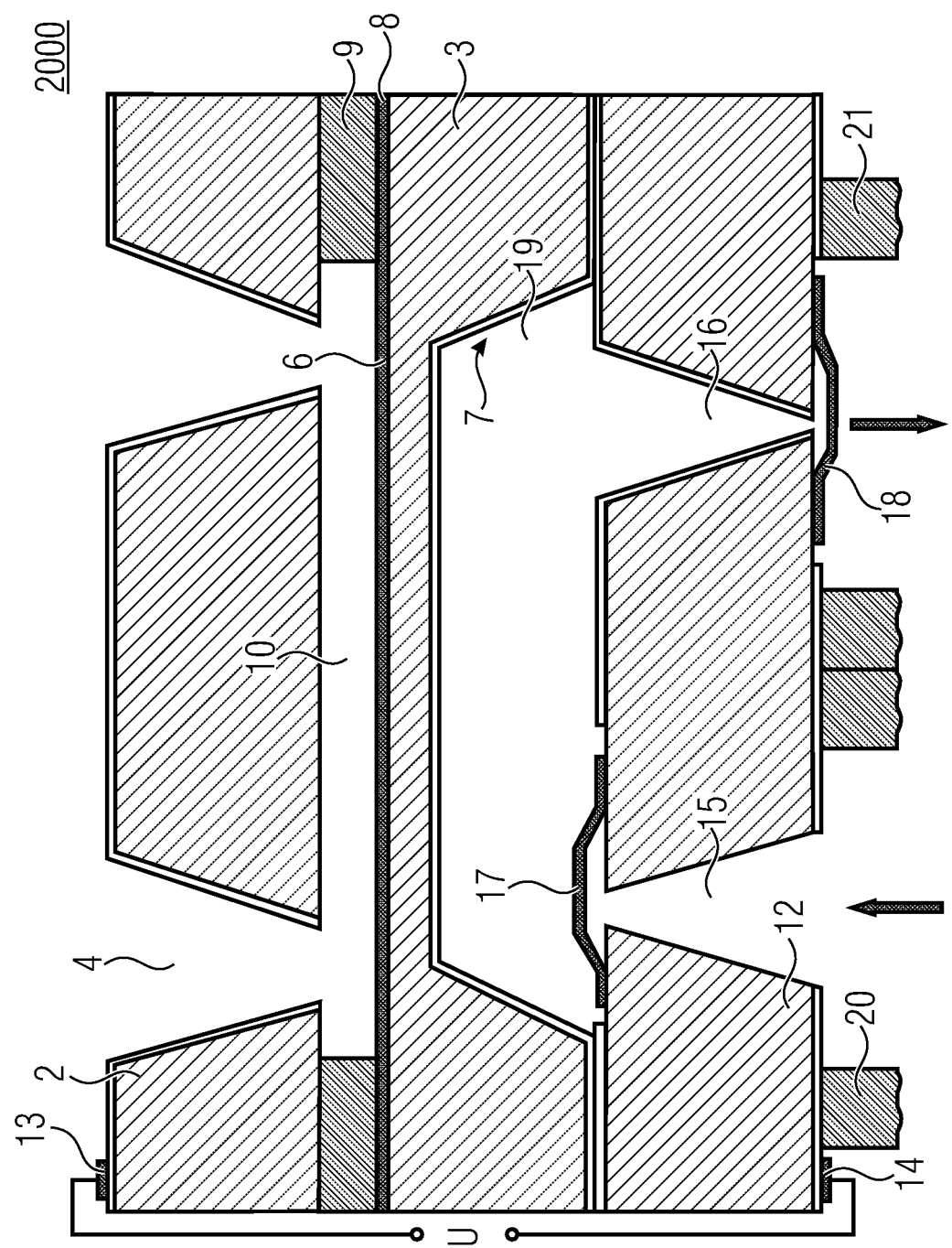
FIG. 20 shows a known micro-pump.

FIG. 20 shows a known electrostatic micro-pump 2000 of Zengerle et al., having, for example, a silicon diaphragm with a thickness of e. g. 40 µm and a side length of e. g. 5 mm. This micro-pump is able to overcome a back pressure of, e. g. approximately 30 kPa, equivalent to 0.3 bars, with an incompressible fluid, such as water. If its diaphragm were preloaded by vacuum, the electrode chamber would need considerably more space.

The Zengerle pump has a e. g. 5 µm distance between the diaphragm layer and the stator structure. The disadvantages of the Zengerle pump are, that it comprises a low displacement, such as only e. g. 40 nl, that it requires high voltages, for example, at least 200 volt, and the usage of a vented chamber.

Advantages of a wandering wedge comprise a low required voltage because of the high field strength in the wedge area, and a high volume stroke, which is possible by rolling the wandering wedge. As a disadvantage, it has smaller stroke volumes compared to non-pre-deflected diaphragms.

An adjustment of the negative pressure during the wafer bonding enables other forms of structures. The zero distance of the pre-deflected diaphragm can be adjusted by the negative pressure and a design of the electrode chamber. Thus, a mixed form of a wandering wedge pump and a normal pump can be realized.

The known micro-pump 2000 is different in terms of production and function from the current application.

First, the deflection of the diaphragm of layer 3, as well as the insulation layer 8 of the known micro-pump takes place in the electrode or actuator chamber 10 towards the layer 2, and away from the pump chamber 90.

A further difference is that the electrical insulation of the known micro-pump is provided by the insulation layer 8 and the electrical breakthrough protecting spacers 9.

A further difference is that the sidewall insulation of the known micro-pump is impractical, and only possible with processing the individual pieces one-by-one after dicing, because the sawing and/or dicing destroys any sidewall insulation.

Furthermore, the distance between the electrode structures are not adjusted in order to reduce the supply voltage. And anti-stiction bumps are lacking from the known micro-pump as well.

IMPLEMENTATION ALTERNATIVES

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An electrostatic micro-pump comprising
a diaphragm arrangement comprising a diaphragm and a first electrode structure;
a valve arrangement, comprising an inlet check valve and an outlet check valve, wherein the diaphragm arrangement and the valve arrangement at least partially enclose a pump chamber;
a second electrode structure arranged so as to form an electrostatic drive with the first electrode structure, the electrostatic drive configured to deflect the diaphragm;
at least one anti-stiction bump arranged between the first electrode structure and the second electrode structure, wherein, in an inactive state of the micro-pump, a spacing between the first electrode structure and the second electrode structure varies towards a center region of the pump chamber when starting from a peripheral region of the pump chamber, the peripheral region enclosing the center region;
a stator structure, the diaphragm arrangement arranged between the valve arrangement and the stator structure, such that the stator structure and the diaphragm arrangement enclose an electrode chamber, the stator structure comprising a conductive layer being at least a part of the second electrode structure; and
a vent opening, configured to connect the electrode chamber with an environment of the electrostatic micro-pump and to facilitate a movement of the diaphragm arrangement towards the stator structure, wherein the vent opening is configured to prevent a contamination of the electrode chamber of the electrostatic micro-pump,
the electrostatic micro-pump being adapted according to at least one of:
wherein the first electrode structure or the second electrode structure comprises a varying height profile, increasing the spacing between the first electrode structure and the second electrode structure from the peripheral region towards the center region of the pump chamber;
wherein, in the peripheral region, the first electrode structure and the second electrode structure are insulated from each other by an insulating layer providing for a mechanical contact to the first electrode structure and the second electrode structure and preventing an occurrence of an electric break-through between the first electrode structure and the second electrode structure;
wherein the valve arrangement is a layer arrangement, wherein the inlet check valve and the outlet check valve are arranged in-plane with respect to the valve arrangement, wherein both the inlet check valve and the outlet check valve comprise an inlet-tunnel, a valve flap, an outlet-tunnel and a dead volume, configured to guide a fluid flow through the inlet-tunnel, through the valve flap in an opened state, and through the outlet-tunnel, and wherein a direction of the fluid flow through the inlet check valve is opposite to a direction of the fluid flow through the outlet check valve;
wherein the valve arrangement comprises a stack of semiconductor-layers and comprises a thickness, perpendicular to a main surface of the valve arrangement, of 480 μm-540 μm, wherein the diaphragm arrangement comprises a semiconductor-layer with a thickness, perpendicular to a main surface of the valve arrangement, of 10 μm-120 μm and wherein the stator structure comprises a silicon-layer and comprises a thickness, perpendicular to a main surface of the valve arrangement, of 450 μm;
wherein the electrostatic drive is configured to change a pressure in the pump chamber or a volume of the pump chamber based on a voltage between the first electrode structure and a second electrode structure, wherein the voltage is a bipolar driving voltage which reduces an effect of electrostatic sticking, and wherein the first electrode structure or the second electrode structure comprises a varying height profile, increasing the spacing between the first electrode structure and the second electrode structure from the peripheral region towards the center region of the pump chamber; or
wherein the vent opening comprises a buffer volume or a capillary stop configured to prevent a contamination of the electrode chamber.

2. The electrostatic micro-pump according to claim 1, wherein the at least one anti-stiction bump is arranged at the second electrode structure opposing the varying height profile.

3. The electrostatic micro-pump according to claim 1, wherein the diaphragm arrangement comprises a conductive layer being at least a part of the first electrode structure.

4. The electrostatic micro-pump according to claim 1, wherein, when being actuated, the electrostatic drive is configured to deflect the diaphragm arrangement towards the stator structure to expand the pump chamber, resulting in a fluid flow into the pump chamber through the inlet check valve.

5. The electrostatic micro-pump according to claim 1, wherein the stator structure comprises a higher stiffness when compared to the diaphragm arrangement.

6. The electrostatic micro-pump according to claim 1, wherein the vent opening comprises a filter and a buffer volume configured to prevent a contamination of the electrode chamber.

7. The electrostatic micro-pump according to claim 1, wherein the diaphragm of the diaphragm arrangement is either pre-deflected or is so pre-deflected, that it forms a mechanical contact with the stator structure in an unactuated state of the electrostatic drive in a contact area, and wherein the electrostatic drive is adapted to increase the contact area in an actuated state.

8. The electrostatic micro-pump according to claim 1, wherein the vent opening is configured to prevent a contamination of the electrode chamber by using a meander, a high flow resistance or a capillary stop.

9. The electrostatic micro-pump according to claim 1, wherein the vent opening is configured to prevent a contamination of the electrode chamber by comprising a filter or a buffer volume.

10. The electrostatic micro-pump according to claim 1, wherein the diaphragm of the diaphragm arrangement is pre-deflected, wherein the diaphragm of the diaphragm arrangement is so pre-deflected, that it forms a mechanical contact with the stator structure in an unactuated state of the electrostatic drive in a contact area, or wherein the electrostatic drive is adapted to increase the contact area in an actuated state.

11. The electrostatic micro-pump according to claim 1, wherein a diameter of the vent opening is 1 µm.

12. A process to produce an electrostatic micro-pump, comprising:
arranging a diaphragm arrangement, so as to comprise a diaphragm and a first electrode structure;
arranging a valve arrangement, so as to comprise an inlet check valve and an outlet check valve, such that the diaphragm arrangement and the valve arrangement enclose at least partially a pump chamber;
arranging a second electrode structure, so as to form an electrostatic drive with the first electrode structure to deflect the diaphragm;
arranging at least one anti-stiction bump between the first electrode structure and the second electrode structure, such that, in an inactive state of the micro-pump, a spacing between the first electrode structure and the second electrode structure varies towards a center region of the pump chamber when starting from a peripheral region of the pump chamber, the peripheral region enclosing the center region;
arranging a stator structure, such that, the diaphragm arrangement is arranged between the valve arrangement and the stator structure, such that the stator structure and the diaphragm arrangement enclose an electrode chamber, and such that the stator structure comprises a conductive layer being at least a part of the second electrode structure; and
arranging a vent opening, which connects the electrode chamber with an environment of the electrostatic micro-pump, such that a movement of the diaphragm arrangement towards the stator structure is facilitated and the vent opening prevents a contamination of the electrode chamber;
such that the electrostatic micro-pump is adapted according to at least one of;
that the first electrode structure or the second electrode structure comprises a varying height profile, increasing the spacing between the first electrode structure and the second electrode structure from the peripheral region towards the center region of the pump chamber;
that in the peripheral region the first electrode structure and the second electrode structure are insulated from each other by an insulating layer providing for a mechanical contact to the first electrode structure and the second electrode structure and prevents an occurrence of an electric break-through between the first electrode structure and the second electrode structure;
that the valve arrangement is a layer arrangement, such that the inlet check valve and the outlet check valve are arranged in-plane with respect to the valve arrangement, such that both the inlet check valve and the outlet check valve comprise an inlet-tunnel, a valve flap, an outlet-tunnel and a dead volume, configured to guide a fluid flow through the inlet-tunnel, through the valve flap in an opened state, and through the outlet-tunnel, and wherein a direction of the fluid flow through the inlet check valve is opposite to a direction of the fluid flow through the outlet check valve;
that the valve arrangement comprises a stack of semiconductor-layers and comprises a thickness, perpendicular to a main surface of the valve arrangement, of 480 µm-540 µm, such that the diaphragm arrangement comprises a semiconductor-layer with a thickness, perpendicular to a main surface of the valve arrangement, of 10 µm-120 µm and such that the stator structure comprises a silicon-layer and comprises a thickness, perpendicular to a main surface of the valve arrangement, of 450 µm;
that the electrostatic drive is configured to change a pressure in the pump chamber or a volume of the pump chamber based on a voltage between the first electrode structure and a second electrode structure, such that the voltage is a bipolar driving voltage which reduces an effect of electrostatic sticking, and such that the first electrode structure or the second electrode structure comprises a varying height profile, increasing the spacing between the first electrode structure and the second electrode structure from the peripheral region towards the center region of the pump chamber; or
that the vent opening comprises a buffer volume or a capillary stop configured to prevent a contamination of the electrode chamber.

13. The process to produce the electrostatic micro-pump according to claim 12, wherein arranging the stator structure comprises:
providing a first layer with a varying height profile and an insulation ditch on a first main surface of the first layer; and
forming an insulation layer on the first main surface of the first layer, in order to arrange the stator structure.

14. The process to produce the electrostatic micro-pump according to claim 13, wherein arranging the diaphragm arrangement comprises further:
- providing a second layer; and
- attaching the first main surface of the first layer to a first main surface of the second layer to form an electrode chamber between the varying height profile of the first layer and the first main surface of the second layer,
- thinning a second main surface, parallel to the first main surface, of the second layer, at least at a region of an opposite side of the electrode chamber in order to arrange the diaphragm arrangement.

15. The process to produce the electrostatic micro-pump according to claim 14, wherein arranging the valve arrangement comprises producing the inlet check valve and the outlet check valve by:
- forming a first substrate with a first ditch structure on a first main surface of the first substrate,
- forming a second substrate with a second ditch structure on a first main surfaces of the second substrate,
- providing a stack of substrates by attaching the first main surface with a ditch structure of the first substrate to the first main surface with a ditch structure of the second substrate, such that the first ditch structure or the second ditch structure creates at least one cavity in the stack of substrates,
- thinning the first main surface or the second main surface of the stack of substrates, and
- recessing the stack of substrates from a first main surface and from a second main surface, parallel to the first main surface, at the at least one cavity, so as to create an inlet-tunnel and an outlet-tunnel and a valve flap in between, configured to guide a fluid flow through the inlet-tunnel, through the valve flap, in an opened state, and through the outlet-tunnel, wherein a direction of a fluid flow through the inlet check valve is opposite to a direction of a fluid flow through the outlet check valve, in order to produce the valve arrangement.

16. The process to produce the electrostatic micro-pump according to claim 12, wherein the arranging the second electrode structure comprises execution of a wafer bonding process or execution of a deposition process to deposit an electrode material or an insulator material.

17. The process to produce the electrostatic micro-pump according to claim 14, wherein the arranging the at least one anti-stiction bump comprises forming the at least one anti-stiction bump at a region of the pump chamber on the first main surface of the first layer, on a first main surface or a second main surface, parallel to the first main surface, of the second layer or on a main surface of the valve arrangement, opposing the diaphragm arrangement.

18. The process to produce a micro-pump according to claim 14, comprising:
- attaching the diaphragm arrangement to the valve arrangement, such that the diaphragm arrangement and the valve arrangement is forming a pump chamber,
- dicing the first layer at the insulation ditch,
- depositing a conducting layer on the second main surface of the first layer of the diaphragm arrangement and on the first main surface of the second layer of the diaphragm arrangement, or on a surface of the valve arrangement, and
- dicing the second layer, in order to produce the micro-pump.

\* \* \* \* \*